US012547926B2

(12) United States Patent
Das et al.

(10) Patent No.: US 12,547,926 B2
(45) Date of Patent: Feb. 10, 2026

(54) STAGED BIAS MEASUREMENTS IN MACHINE LEARNING PIPELINES

(71) Applicant: Amazon Technologies, Inc., Seattle, WA (US)

(72) Inventors: Sanjiv Das, San Jose, CA (US); Michele Donini, Berlin (DE); Jason Lawrence Gelman, Los Altos, CA (US); Kevin Haas, Los Gatos, CA (US); Tyler Stephen Hill, Los Altos, CA (US); Krishnaram Kenthapadi, Sunnyvale, CA (US); Pinar Altin Yilmaz, Palo Alto, CA (US); Muhammad Bilal Zafar, Berlin (DE); Pedro L Larroy, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 915 days.

(21) Appl. No.: 17/106,013

(22) Filed: Nov. 27, 2020

(65) Prior Publication Data
US 2022/0172099 A1 Jun. 2, 2022

(51) Int. Cl.
*G06N 20/00* (2019.01)
*G06F 18/214* (2023.01)
*G06V 10/75* (2022.01)

(52) U.S. Cl.
CPC ........... *G06N 20/00* (2019.01); *G06F 18/214* (2023.01); *G06V 10/751* (2022.01)

(58) Field of Classification Search
CPC .......... G06N 20/00; G06N 5/045; G06N 3/08; G06N 3/105; G06F 18/214; G06F 18/40; G06F 11/321; G06F 17/18; G06F 3/0482; G06F 18/24; G06F 18/217; G06F 9/542; G06F 11/3409; G06V 10/751; H04L 67/10

See application file for complete search history.

(56) References Cited

U.S. PATENT DOCUMENTS

| | | | |
|---|---|---|---|
| 8,595,153 | B2 | 11/2013 | Drucker et al. |
| 9,779,362 | B1 | 10/2017 | Gold |
| 10,678,771 | B1 | 6/2020 | Kenthapadi et al. |
| 10,990,901 | B2 | 4/2021 | Deo et al. |
| 2017/0193392 | A1 | 7/2017 | Liu et al. |

(Continued)

FOREIGN PATENT DOCUMENTS

WO 2020214187 A1 10/2020

OTHER PUBLICATIONS

"AI Explainability 360", by Animesh Singh, retrieved from https://www.ibm.com/opensource/open/projects/ai-explainability/ and published Aug. 8, 2019 (referred to as Singh) (Year: 2019).*

(Continued)

*Primary Examiner* — Sanchita Roy
(74) *Attorney, Agent, or Firm* — S. Scott Foster; Kowert, Hood, Munyon, Rankin & Goetzel, P.C.

(57) ABSTRACT

Bias metrics may be captured at different stages for training a machine learning model. A training job may specify bias metrics to capture at multiple different stages of a machine learning pipeline for a feature of a training data set used to train a machine learning model. The training job may be executed and the bias metrics determined at the stages as specified in the training job. The bias metrics for the different stages may be stored.

20 Claims, 19 Drawing Sheets

(56) References Cited

U.S. PATENT DOCUMENTS

| | | | |
|---|---|---|---|
| 2017/0243140 A1 | 8/2017 | Achin et al. | |
| 2019/0113973 A1 | 4/2019 | Coleman | |
| 2019/0279102 A1 | 9/2019 | Cataltepe | |
| 2019/0378210 A1 | 12/2019 | Merrill | |
| 2020/0082299 A1 | 3/2020 | Vasconcelos et al. | |
| 2020/0160180 A1 | 5/2020 | Lehr et al. | |
| 2020/0183035 A1 | 6/2020 | Liu | |
| 2020/0184259 A1 | 6/2020 | Mswanathan | |
| 2020/0320428 A1 | 10/2020 | Chaloulos et al. | |
| 2020/0372406 A1* | 11/2020 | Wick | G06N 20/00 |
| 2020/0372472 A1 | 11/2020 | Kenthapadi et al. | |
| 2021/0035021 A1 | 2/2021 | Sasson | |
| 2021/0166151 A1 | 6/2021 | Kennel et al. | |
| 2021/0241033 A1 | 8/2021 | Yang | |
| 2021/0241115 A1 | 8/2021 | Ibrahim | |
| 2021/0406712 A1* | 12/2021 | Bhide | G06N 3/08 |
| 2022/0067460 A1 | 3/2022 | Raj | |

OTHER PUBLICATIONS

"Docker Containers and APIs: A Brief Overview" by Kristopher Sandoval, published Sep. 1, 2015 and retrieved from https://nordicapis.com/docker-containers-and-apis-a-brief-overview/ (Year: 2015).*

U.S. Appl. No. 17/106,021, filed Nov. 27, 2020, Sanjiv Das, et al.
U.S. Appl. No. 17/106,029, filed Nov. 27, 2020, Sanjiv Das, et al.
U.S. Appl. No. 17/106,027, filed Nov. 27, 2020, Sanjiv Das, et al.
PCT Application No. PCT/US21/60451, filed Nov. 23, 2021, Sanjiv Das, et al.
U.S. Appl. No. 17/535,946, filed Nov. 26, 2021, Cedric Philippe Archambeau.
U.S. Appl. No. 17/535,945, filed Nov. 26, 2021, Cedric Philippe Archambeau.
U.S. Appl. No. 17/535,942, filed Nov. 26, 2021, Cedric Philippe Archambeau.
U.S. Appl. No. 17/535,909, filed Nov. 22, 2021, Ashish Rajendra Rathi, et al.
U.S. Appl. No. 17/535,908, filed Nov. 26, 2021, Krishnaram Kenthapadi, et al.
U.S. Appl. No. 17/535,912, filed Nov. 26, 2021, Cedric Philippe Archambeau.
U.S. Appl. No. 17/535,932, filed Nov. 26, 2021, Xiaoguang Chen.
U.S. Appl. No. 17/548,055, filed Dec. 10, 2021, Sunil Mallya Kasaragod.
U.S. Appl. No. 17/535,929, filed Nov. 26, 2021, Cedric Philippe Archambeau.
International Search Report and Written Opinion mailed Mar. 18, 2022 in PCT/US2021/060451.

* cited by examiner

STAGED BIAS MEASUREMENTS IN MACHINE LEARNING PIPELINES

BACKGROUND

Machine-learned models and data-driven systems have been increasingly used to help make decisions in application domains such as financial services, healthcare, education, and human resources. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

Figure 1:
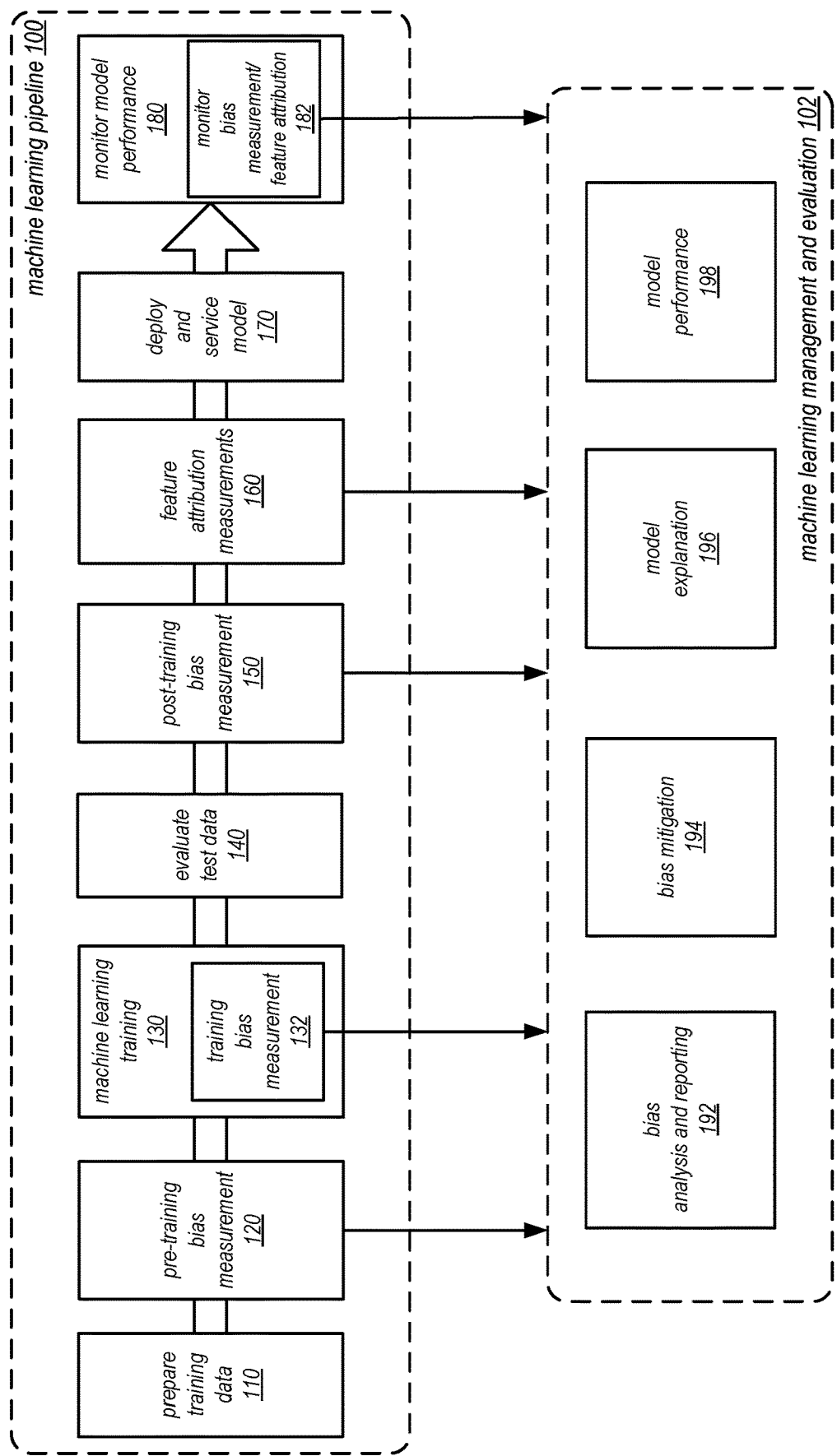
FIG. 1 illustrates a logical block diagram of staged bias measurements and feature attribution capture in machine learning pipelines, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of staged bias measurements and feature attribution capture in machine learning pipelines are described herein. Because machine learning models can be shaped by many different factors when used in different application, biased outcomes can occur in ways that may not be easily detectable. For example, in various scenarios, understanding why a machine learning model made a decision (e.g., a prediction or other inference) and whether that prediction was impacted by any bias, before, during, or after training may be important to prevent potentially discriminatory impact by applications that use the machine learning model in order to address various ethical, policy, and legal concerns. For example, laws that prohibit discrimination based on "protected attributes" may need to be considered when developing applications that rely upon a machine learning model to ensure compliance with these laws. In order to ensure trust in various domains of application, reliable explanations for the behavior of machine learning models as well as insight into how such machine learning models make decisions, allowing for various users or systems that rely upon such decisions to have confidence in the provided decisions. In various scientific applications, understanding whether a machine learning model is making decisions noisy or irrelevant features may allow for machine learning model development to better proceed with a better understanding of a machine learning model's limitations and failure modes. In these, and various other scenarios, implementing techniques, such as those discussed below with regard to FIGS. 1-16, may improve the performance of applications that incorporate machine learning models, as well as the performance of other systems that rely upon decisions made by these applications.

In various embodiments, a machine learning model may be considered to be biased if the decisions made using the machine learning model (e.g., in an application, service, or system), systematically and unfairly discriminates against certain individuals or groups of individuals in favor of others. For example, in the context of developing unbiased machine learning systems, machine learning models powering applications that learn from data about people and the training data available to learn from may reflect demographic disparities or other inherent biases that exist in targeted societies. For example, the training data may not have sufficient representation of various demographic groups of interest and may contain biased labels. The machine learning models trained on data sets that exhibit such societal biases could end up learning them and then reproduce those biases in their results. Consequently, capturing bias measurements biases that may be present at each stage of a machine learning pipeline may offer many opportunities to prevent or mitigate bias.

In various embodiments, explainability may be providing information that an end user can understand why a decision is made by a system using a machine learning model. As a result of the increasing use of machine learning models to provide artificial intelligence (AI) for systems in various different applications and regulatory "right to explanation" provisions, which focus on the transparency of data-driven automated decision-making, model transparency and interpretability may be implemented. Explainability for machine learning models to provide such model transparency and interpretability AI methods can be classified based on different criteria. For example, interpretable models may be machine learning models with a simple structure (such as sparse linear models or shallow decision trees) that can "explain themselves," e.g., are easy for humans to interpret. Post-hoc explanation methods may attempt to analyze and explain a relatively more complex machine learning model after it has been trained. IN various embodiments, explanation techniques can either be model-specific (e.g., designed for neural networks or other differentiable models) or model-agnostic (e.g., applicable for any ML model, after training). Global explanation, as discussed in detail below, may explain the model behavior as a whole while local explanation methods focus on explaining an individual decision, in various embodiments. Integrating the capture of information, such as feature attribution as discussed below, may provide for opportunities provide both global and local explainability for machine learning models, in various embodiments.

FIG. 1 illustrates a logical block diagram of staged bias measurements and feature attribution capture in machine learning pipelines, according to some embodiments. Machine learning pipeline 100 may include various stages for the training and deployment of a machine learning model (e.g., as part of various systems, services, or applications). Machine learning pipeline 100 may be offered or implemented as part of machine learning systems or services, such as machine learning service 210 discussed below with regard to FIG. 2), which may provide machine learning pipelines that offer integrated bias measurement and feature attribution capture as part of fairness and explanation aware pipelines (e.g., as an instance, container, application, or other selectable feature for use).

In various embodiments, bias may be may be measured from a comparison of the original labels (y=0 or 1) of the data sample with the predicted labels (y'=0 or 1). Assume that type 1 is the accepted case and type 0 is the rejected case (for example, in a loan application use case). In a training data set, the number of labels of types 0 and 1 may be counted, grouped by the restricted feature (denoted class $X_r$, e.g., gender, also denoted earlier as the demographic group or attribute of interest (which may be referred to as a "facet" in some embodiments), which designates the sample into the advantaged group (favored by the bias and marked/subscripted by a) and the disadvantaged group (disfavored by bias and marked/subscripted by d). The number of true labels of type 0, 1 may be denoted as $n^{(0)}$, $n^{(1)}$, respectively, and the number of labels of each class as $n_a$, $n_d$. These comprise labels of the advantaged and disadvantaged class, e.g., $n_a^{(0)}$, $n_a^{(1)}$ and $n_d^{(0)}$, $n_d^{(1)}$, respectively. It also may be that $n_a^{(0)}+n_a(1)=n_a$ and $n_d^{(0)}+n_d^{(1)}=n_d$. Corresponding to this notation for true labels, a parallel notation may be used for predicted labels y', with counts $n'^{(0)}$, $n'^{(1)}$.

In various embodiments, pipeline 100 may include a prepare training data stage 110. Prepare training data stage 110 may include various pre-processing operations (e.g., data type conversions, field re-orderings, combining or separating values, anonymizing or other privacy protection techniques, etc.) to ready training data for use to train a machine learning model. Training on biased data prepared, for instance, at prepare training stage 110, may exacerbate any pre-existing bias in that data. To identify bias in the data before expending time/money on training, bias metrics that can be computed on the data set before training may performed. For example, a survey to determine the "golden truth" may be made and compared to the prepared training data set (or a raw data set that has not gone through prepare training data stage 110) to make sure the data is not too contaminated with bias to be useful. The golden truth may be, in various embodiments, the joint statistical distribution of model inputs that could be used to train any model fairly. These distributions may not always available, so pre-training bias metrics may provide measures for comparison to a golden truth, were it to be available. If not, such information would allow for an evaluation to assess whether the pre-training bias metrics are in violation of a judgment threshold level.

Pre-training bias measurement 120 may be integrated before machine learning training 130, in various embodiments, to provide various bias measurement techniques for prepared training data, in some embodiments. In various embodiments, multiple different pre-training bias measurement techniques implemented as part of pre-training bias measurement 120 may be machine learning model independent and include:

Class imbalance. Bias is often generated from an under-representation of the disadvantaged class in the data set, especially if the desired "golden truth" is equality across classes. As an example, algorithms for granting small business loans may be biased against women because the historical record of loan approvals contains very few women, because women did not usually apply for loans to start small businesses. This imbalance may carry over into model predictions. If $n_a$ is the number of members of the advantaged class and $n_d$ the number for the disadvantaged class, the class imbalance measure may be represented as $$\frac{n_a - n_d}{n_a + n_d}.$$

In various embodiments, a range for this metric may be (−1,1).

Difference in positive proportions in true labels (DPL). This metric compares the proportion of positive outcomes for the disadvantaged class versus that of the advantaged class. For example, are men (class a) and women (class d) given college admission in proportion to how many applicants there are of each gender? Let the proportion of men who get admission be equal to $q_a = n_a^{(1)}/n_a$, where $n_a^{(1)}$ is the number of men who gain admission (as opposed to those who do not get admission, $n_a^{(0)}$). Likewise, the proportion of women who are granted admission is $q_d = n_d^{(1)}/n_d$. A bias metric may be DPL=$q_a - q_d$. If DPL is close to 0, then it can be that "demographic parity" has been achieved ex-post (e.g., already in the historical record). Class imbalance may examine lopsidedness in the numbers of a class a versus d, demographic parity may be concerned with the imbalance in label distributions between classes. This metric may be in a range (−1,1).

KL Divergence (KL): A bias metric may compare the probability distribution of labels of the advantaged class ($P_a$) with that of the disadvantaged class ($P_d$), using KL divergence. KL may measure how much the label distribution of each class differs. This measure generalizes easily to multiple label types, not just binary ones. For example, take college admissions, where an applicant may be assigned by a model to three categories: x={rejected, wait-listed, or accepted}. How different the distribution $P_a$ is from $P_d$ may be computed. KL may be a measure of entropy. For all three categories, denoted by x, the ratio log[$P_a(x)/P_d(x)$] may be computed, which is a measure of distance between the probability distributions for a label x. The probability weighted sum of this measure may then be taken, weighted by the probability of $P_a(x)$, which gives the KL measure of divergence of class a from class d. The measure is also a label imbalance metric and is denoted as $$KL(P_a \| P_d) = \sum_x P_a(x) \log\left(\frac{P_a(x)}{P_d(x)}\right).$$

This metric may be non-negative, KL>=0. $P_d(x)$>0 for all x.

Jensen-Shannon divergence (JS): Denoting the average label distribution across the classes as P, the JS divergence may be computed as the average of the KL divergence of the probability distribution of the advantaged class vs. P and the KL divergence of the probability distribution of the disadvantaged class vs. P. This is an extension of the KL label imbalance measure. The reason for this computation is that it works around the fact that KL is not symmetric. The measure may be computed as JS($P_a$, $P_d$, P)=½[KL($P_a$, P)+KL($P_d$,P)]. This metric may be non-negative, JS>=0. It may provide a symmetric difference between label distributions $P_a$ and $P_d$.

Lp-Norm (LP): Another measure of distance in label distributions is the normed direct distance between the distributions. For every label category, e.g., x={rejected, wait-listed, accepted} in college admissions, the difference may be taken and take the p-polynomial mean. The measure is computed as $L_p(P_a, P_d) = [\Sigma_x |P_a(x) - P_d(x)|^p]$. This metric may be non-negative, LP>=0.

Total variation distance (TVD): this is half the Hamming (L_1) distance between the probability distribution of labels of the advantaged class and the probability distribution of labels of the disadvantaged class TVD=½$L_1(P_a, P_d)$>=0. This metric may be non-negative, TVD>=0.

Kolmogorov-Smirnov (KS), two-sample approximated version: This metric evaluates the KS statistical test between the probability distribution of labels of the advantaged class and the probability distribution of labels of the disadvantaged class. This metric indicates whether there is a big divergence in one of the labels across classes. It complements the other measures by zoning in on the most imbalanced label and may be represented as KS=max (|$P_a(x) - P_d(x)$|). This metric may be in the range (0,1).

Conditional Demographic Disparity in Labels (CDDL): This metric examines disparity of outcomes (labels) between two classes, advantaged and disadvantaged, but it also examines this disparity in subgroups, by stratifying the data using a "group" variable. The metric examines whether the disadvantaged class has a bigger proportion of the rejected outcomes than the proportion of accepted outcomes for the same class. For example, in the case of college admissions, if women applicants comprised 60% of the rejected applicants and comprised only 50% of the accepted applicants, then it may be that there is demographic disparity (DD) because the rate at which women were rejected is greater than the rate at which they are accepted. Demographic disparity (DD) may be described as the difference between the proportion of rejected outcomes and the proportion of accepted outcomes for a given class. For simplicity, assume that all the applicants can be grouped as either men or women. Suppose men comprised 40% of the rejected applicants and 40% of the accepted applicants, and hence, women comprised 60% of the rejected applicants and 60% of the accepted applicants. In this case, there is no demographic disparity, but by the other metric DPL above, there is no demographic parity. Conditional Demographic Disparity (CDDL) may be the weighted average of demographic disparity (DD) over different classes, with each class weighted by its size, represented as $$CDD = \frac{1}{n}\sum_i n_i \cdot DD_i, \quad \sum_i n_i = n.$$

Both DD and CDDL may be in the range (−1, +1).

Machine learning training stage 130 may take the prepared training data (e.g., which may have passed, been mitigated, or at least understood using pre-training bias measurement 120), and perform various machine learning techniques to train a machine learning model. Various different types of machine learning models may be implemented (e.g., neural networks, support vector machines, linear regression, decision trees, naïve Bayes, nearest neighbor, q-learning, temporal difference, deep adversarial networks, among others). As part of machine learning training bias measurement 132 may be accounted for. For example, bias may be used for tuning techniques to train a machine learning model to avoid bias. Bias metrics may be captured and stored, as part of the various techniques discussed below at machine learning training stage 130. Evaluate test data stage 140 may be where automated or manual techniques (e.g., performed by engineers or data scientists) consider the performance of the machine learning model training stage 130 and the resulting trained model. Changes to the machine learning model and training techniques may be made, in some embodiments.

As indicated at 150, post-training bias measurement 150 may be implemented as part of machine learning pipeline to capture various bias measurements after a machine learning model is trained. After training a machine learning model, additional information may be obtained from the model itself. For example, the predicted probabilities from the model (p') and the predicted labels (y'). These allow an additional set of bias metrics to be calculated. Any bias that arises post-training may emanate from biases in the data and/or biases in the model's classification and prediction. Post-training bias metrics may include:

Difference in positive proportions in predicted labels (DPPL): This is described as the difference in the proportion of positive predictions (y'=1) for the advantaged class versus the proportion of positive predictions (y'=1) for the disadvantaged class. For example, if the model grants loans to 50% of women and to 60% of men, then it may be biased against women. It may have to be decided whether a 10% difference is material. A similar bias would be detected in hiring situations, college admissions, etc. The measure would be $$\hat{q}_a = \frac{\hat{n}_a^{(1)}}{n_a}, \hat{q}_d = \frac{\hat{n}_d^{(1)}}{n_d},$$

$\hat{q}_a - \hat{q}_d$. This metric may be in a range of (−1,1). The carat may denote model predicted or estimated label numbers.

Disparate (Adverse) Impact (DI): The same metric may be assessed in the form of a ratio $$DI = \frac{\hat{q}_d}{\hat{q}_a}.$$

This metric may be DI>=0. Thresholds for this metric may be specified.

Difference in conditional outcome (DCO): This metric compares the actual labels to the predicted labels from the model and assesses whether this is the same across classes. For instance, were there more than predicted loans given to one class and less to others? Example: of 100 men and 50 women, the model recommended that 60 men and 30 women be given loans, so the predicted proportions are fair (DPPL satisfied, but not DPL), but the data set shows that 70 men and 20 women were given a loan instead, suggesting bias, measured by a comparison of predicted labels vs true labels. Clearly here, the lender is giving more loans to men than assessed by the model and fewer loans to women than prescribed by the model. The DCO metric captures this sort of bias. This metric accounts for whether one group is deserving or not and then measures bias. DCO may be broken down into two types, Difference in Conditional Acceptance (DCA) and Difference in Conditional, (DCR). First, DCA, described as $$c_a = \frac{n_a^{(1)}}{\hat{n}_a^{(1)}} c_d = \frac{n_d^{(1)}}{\hat{n}_D^{(1)}},$$

DCA=$c_a$−$c_d$. DCA may be unbounded. Second is for rejection rates, described as $$r_a = \frac{n_a^{(0)}}{\hat{n}_a^{(0)}} c_d = \frac{n_d^{(0)}}{\hat{n}_D^{(0)}},$$

DCR=$r_d$−$r_a$. DCR may be unbounded.

Recall Difference (RD): A metric may be for knowing whether there is a difference in recall of the model across the attributes of interest. Recall bias metric may be how often the model correctly captures the cases that should receive a positive outcome. For example, of all the people who should be given loans, how many are detected correctly by the model? Recall may be perfect for a class if all y=1 cases are correctly called as y'=1 for that class. If recall is high for lending to nonminorities but low for lending to minorities, then the difference may be a measure of bias against minorities (the minority class may be defined in many ways, such as by gender, age, etc., for example with race, there may be some races categorized as minorities, such as African Americans, Hispanics, and Native Americans). Here, higher recall for the advantaged class suggests that the machine learning model predicts fewer false negatives for the advantaged class than for the disadvantaged class, (e.g., it finds more of the actual true positives for the advantaged class than the disadvantaged class), which is a form of bias. RD may be the difference in recall for the advantaged vs. disadvantaged group, described as $$RD = \frac{TP_a}{TP_a + FN_a} - \frac{TP_d}{TP_d + FN_d}.$$

Recall may be greater when the machine learning model minimizes false negatives. RD may be in a range of (−1,+1).

Difference in label rates (DLR): labels may be positive or negative outcomes. The difference in the rates of these positive and negative predicted outcomes across the advantaged and disadvantaged classes is a measure of bias. Two types of bias metrics for this difference may be (a) Difference in acceptance rates (DAR): This metric measures whether qualified applicants from the advantaged and disadvantaged classes are accepted at the same rates. It is the difference in the ratio of true positives to predicted positives for each class; (b) Difference in rejection rates (DRR): This metric measures whether qualified applicants from the advantaged and disadvantaged class are rejected at the same rates. It is the difference in the ratio of true negatives to predicted negatives for each class. These two metrics may be described as $$DAR = \frac{TP_a}{\hat{n}_a^{(1)}} - \frac{TP_d}{\hat{n}_d^{(1)}} \quad DRR = \frac{TN_d}{\hat{n}_d^{(0)}} - \frac{TN_a}{\hat{n}_a^{(0)}}.$$

These metrics may be in a range of (−1,+1). DAR may be precision different between advantaged and disadvantaged classes.

Precision difference (PD). If the precision for the advantaged class is greater than the precision for the disadvantaged class, it implies that more of the predicted true positives are valid compared to false positives for the advantaged class. This suggests that predictions favor the advantaged class. PD may be the difference in precision for the advantaged vs. disadvantaged classes. Precision difference is the same as DAR. PD may be a measure of Type I error and the higher the precision, the lower the number of false positives. Precision difference may be in the range (−1,+1)

Accuracy Difference (AD). Classification by the ML model may be more accurate for one class than the other. This is a useful metric because it indicates that one class incurs a greater proportion of Type I and Type II errors. For example, if loan approvals are made with much higher accuracy for men than for women, it means that a greater proportion of qualified women are denied a loan and greater proportion of unqualified women get a loan too. This leads to within group unfairness for women even if the proportion of loans granted is nearly the same for both men and women (DPPL close to 0). AD may be described as $$AD = \frac{TP_a + TN_a}{TP_a + TN_a + FP_a + FN_a} - \frac{TP_d + TN_d}{TP_d + TN_d + FP_d + FN_d}.$$

This metric may be in the range (−1,+1)

Treatment Equality (TE): This may be the difference in the ratio of false positives to false negatives for the advantaged vs. disadvantaged classes. Even if the accuracy across classes is the same, is it the case that errors are more harmful to one class than another? TE measures whether errors are compensating in the same way across classes. Example: 100 men and 50 women apply for a loan. 8 men were wrongly denied a loan and another 6 were wrongly approved. For women, 5 were wrongly denied and 2 were wrongly approved. The ratio of false positives to false negatives equals 0.75 for men and 0.40 for women, and hence TE=0.75−0.40=0.35, even though both classes have the same accuracy of 0.86. TE may be described as $$\frac{FP_a}{FN_a} - \frac{FP_d}{FN_d}.$$

Conditional Demographic Disparity in Predicted Labels (CDDPL): A comparison of difference in predicted rejection proportion and predicted acceptance proportion across classes. This metric is exactly the same as the pre-training metric except that it is computed off the predicted labels instead of the actual ones. This metric lies in the range (−1,+1).

Counterfactual Fliptest (FT): The fliptest is an approach that looks at each member of the disadvantaged class and assesses whether similar members of the advantaged class have different model predictions. The members of the advantaged class are chosen to be k-nearest neighbors of the observation from the disadvantaged class. It may be determined how many nearest neighbors of the opposite class receive a different prediction, where the flipped prediction can go from positive to negative and vice versa. There are two versions of this metric:

$$FT_1 = \frac{|F^+(h, G)| + |F^-(h, G)|}{n_d} \text{ and}$$

$$FT_2 = \frac{|F^+(h, G)| + |F^-(h, G)|}{n_d}.$$

As indicated at 160, feature attribution measurements may be determined as part of machine learning pipeline 100. In various embodiments, feature attribution may be determined using Shapley values. Feature attribution measurements can be provided at an instance level, for a specific prediction made by a machine learning model and at a global level for the machine learning model as a whole. For example, in some embodiments, the feature attributions may be be the Shapley values in a game (e.g., from game theory) where the total payoff is the model prediction with all the features included, and the players are the individual features. Taking the example of a college admission scenario, consider a model with features {SAT Score, GPA, Class Rank}, where it is desirable to explain the model prediction for a candidate. The range of model prediction is 0-1. The prediction for a candidate is 0.95. Then in the game, the total payoff would be 0.95 and the players would be the three individual features. If for the candidate, the Shapley values are {0.65, 0.7, −0.4}, then it may be determined that the GPA affects the prediction the most, followed by the SAT score. It may also be determined that while GPA and SAT score affect the prediction positively, the class rank affects it negatively (note that a lower rank is better).

Feature attribution measurements 160 may also rely upon reference data, as explanations may be contrastive (e.g., to show deviation from some reference data). in a machine learning context corresponds to a hypothetical instance that can be either uninformative or informative. During the computation of Shapley values, several new instances (e.g., data sets) between the reference data set and the given instance, in which the absence of a feature is modeled by setting the feature value to that of the reference data set and the presence of a feature is modeled by setting the feature value to that of the given instance. Thus, the absence of all features corresponds to the reference data set and the presence of all features corresponds to the given instance. Often it is desirable to select a reference data set with very low information content. For example, an average instance can be constructed from the training data set by taking either the median or average for numerical features and the mode for categorical features. For the college admissions example, this could be used to explain why a particular applicant was accepted as compared to a reference data set consisting of an average applicant.

Alternatively, explanations can be generated with respect to informative reference data sets. For the college admissions scenario, it might be likely to explain why a particular applicant was rejected when compared with other applicants from similar demographic backgrounds. In this case, a reference data set can be chosen that represents the applicants of interest, namely those from a similar demographic background. Thus, informative reference data sets can be used to concentrate analysis on the specific aspects of a particular model prediction. They can isolate the actionable features for assessment by setting demographic attributes and other non-actionable features to the same value as in the given instance. As discussed below with regard to FIG. 3, reference data sets can be specified as part of a training job, in some embodiments.

In various embodiments, computing the Shapley values involves considering all possible coalitions of features. This means that given d features, there are 2d such possible feature coalitions, each corresponding to a potential model that needs to be trained and evaluated. Even for reasonable values of d, say 50 features, it may be computationally prohibitive and impractical to train 2d possible models, and hence various approximation techniques may be used, in some embodiments. For example, SHAP (SHapley Additive exPlanations), may be used which incorporates such approximations. In various embodiments, a scalable and efficient implementation of the Kernel SHAP algorithm through additional optimizations, as discussed in detail below with regard to FIGS. 5 and 14, may be implemented.

Global explanations of machine learning models may be provided, in some embodiments, according to feature attribution measurements 160. For example, global explanation of an ML model by aggregating the Shapley values over multiple instances. Different ways of aggregation may be implemented, in various embodiments, such as mean of absolute SHAP values for all instances, "median": median of SHAP values for all instances, and mean of squared SHAP values for all instances.

As indicated at 170, a trained machine learning model may be deployed and into service for applications. For example, an application may implement the model as part of various business or other application logic, or use it to provide feedback to an interface for a user. Trained models may be hosted or use in cloud environments, including being hosted as part machine learning service 210 as discussed below with regard to FIG. 2.

After deployment, monitor model performance stage 180 may also be implemented. Bias measurements and feature attribution measurements, as indicated at 182, may be implemented as part of performance monitoring. For example, measuring bias only during the train-and-deploy phase may not detect all scenarios where bias can exist. It is quite possible that after the model has been deployed, the distribution of the data that the deployed model sees, that is, the live data, is different from that of the training data set. This change may cause the model to exhibit more bias than it did on the training data. The change in the live data distribution might be temporary (e.g., due to some short-lived behavior like the holiday season) or permanent. In either case, it might be important to detect these changes. To detect these changes, monitoring the bias metrics of a deployed model continuously may be performed, as discussed in detail below with regard to FIGS. 9 and 16. For example, bias measurement monitoring at 180, may raise automated alerts if the metrics exceed a threshold. For example, a DPPL bias metric could be monitored. Allowed range of values may be specified, for instance (−0.1, 0.1), that DPPL should lie in during deployment—any deviation from this range should raise a "bias detected" alert. In various embodiments, monitoring jobs can be specified that perform these checks at regular intervals, where $A=(a_{min}, a_{max})$.

For instance, the frequency of the checks can be specified to be 2 days. This means that every 2 days, monitoring may determine DPPL on the data that the model processed during last 2 days time window. If the DPPL value $b_{win}$ computed on $D_{win}$ falls outside of the allowed range A.

To ensure that the conclusions drawn from the observed data are statistically significant, confidence intervals may be implemented in some embodiments. For example, a Normal Bootstrap Interval method may be used to construct an interval $C=c(c_{min}, c_{max})$ such that the true bias value computed over the full live data is contained in C with high probability. Now, if a confidence interval overlaps with the allowed range, then it may be that it is likely that the bias metric value of the live data distribution falls within an allowed range. If C and A are disjoint, then the bias metric does not lie in the allowed range and an alert or other notification may be sent. Thus, in various embodiments, if a Confidence interval C overlaps with the allowed range A, no bias alert may be specified. If a confidence interval C and allowed range A are non-overlapping (e.g., disjoint), then a bias alert may be issued.

Monitoring of feature attribution, as indicated at 182, may be implemented, in various embodiments. For example, a drift in the live data distribution can result in a corresponding drift in the feature attribution values. Taking the example where change from training data to live data seems pretty big; the feature ranking has completely reversed. Similar to the bias drift, the feature attribution drifts may be caused by a change in the live data distribution and warrant a closer look into the model behavior on the live data. Again, the first step in these scenarios is to raise an alarm that a drift has happened.

In various embodiments, a drift can be detected by comparing how the ranking of the individual features changed from training data to live data. In addition to being sensitive to changes in ranking order only, raw attribution score of the features may be instructive. For instance, given two features that fall in the ranking by same number of positions going from training to live data, it may be valuable to be more sensitive to the feature that had a higher attribution score in the training data. With these properties in mind, Normalized Discounted Cumulative Gain (NDCG) score for comparing the feature attributions rankings of training and live data may be implemented, in some embodiments.

For example, NDCG may be determined according to:
$F=[f_1, \ldots, f_m]$ may be the list of features sorted with respect to their attribution scores in the training data where m is the total number of features.
$a(f)$ may be a function that returns the feature attribution score on the training data given a feature f
$F'=[f'_1, \ldots, f'_m]$ may be the list of features sorted with respect to their attribution scores in the live data where m is the total number of features
NDCG may then be described as $$NDCG = \frac{DCG}{iDCG} \text{ with}$$

$$DCG = \sum_{i=1}^{m} \frac{a(f'_i)}{\log_2(i+1)} \text{ and}$$

$$iDCG = \sum_{i=1}^{m} \frac{a(f_i)}{\log_2(i+1)}$$

The quantity DCG measures if features with high attribution in the training data are also ranked higher in the feature attribution computed on the live data. The quantity iDCG measures the "ideal score" and is just a normalizing factor to ensure that the final quantity resides in the range [0, 1], with 1 being the best possible value. A NDCG value of 1 means that the feature attribution ranking in the live data is the same as the one in the training data. A threshold for monitoring may be specified for comparison with respect to the NDCG value, in some embodiments (e.g., alert if <0.9).

The bias metrics and feature attribution captured at various stages as part of machine learning pipeline 100 may be integrated into various techniques for analyzing, visualizing and monitoring, as discussed in detail below with regard to FIGS. 2-16. This data information be stored (e.g., at a common backend store, such as a storage service 230 in FIG. 2), for later use. Various machine learning and evaluation tools 102 may implement or rely upon the stored information to implement various features for bias analysis and reporting 192, bias mitigation 194, model explanation 196, and model performance 198, in various embodiments.

Please note that the previous description of is a logical illustration of staged bias measurements and feature attribution capture in machine learning pipelines and thus is not to be construed as limiting as to the machine learning system.

This specification begins with a general description of a provider network that implements multiple different services, including a machine learning service, which may implement staged bias measurements and feature attribution capture in machine learning pipelines. Then various examples of, including different components/modules, or arrangements of components/module that may implement staged bias measurements and feature attribution capture in machine learning pipelines are discussed. A number of different methods and techniques to implement staged bias measurements and feature attribution capture in machine learning pipelines are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
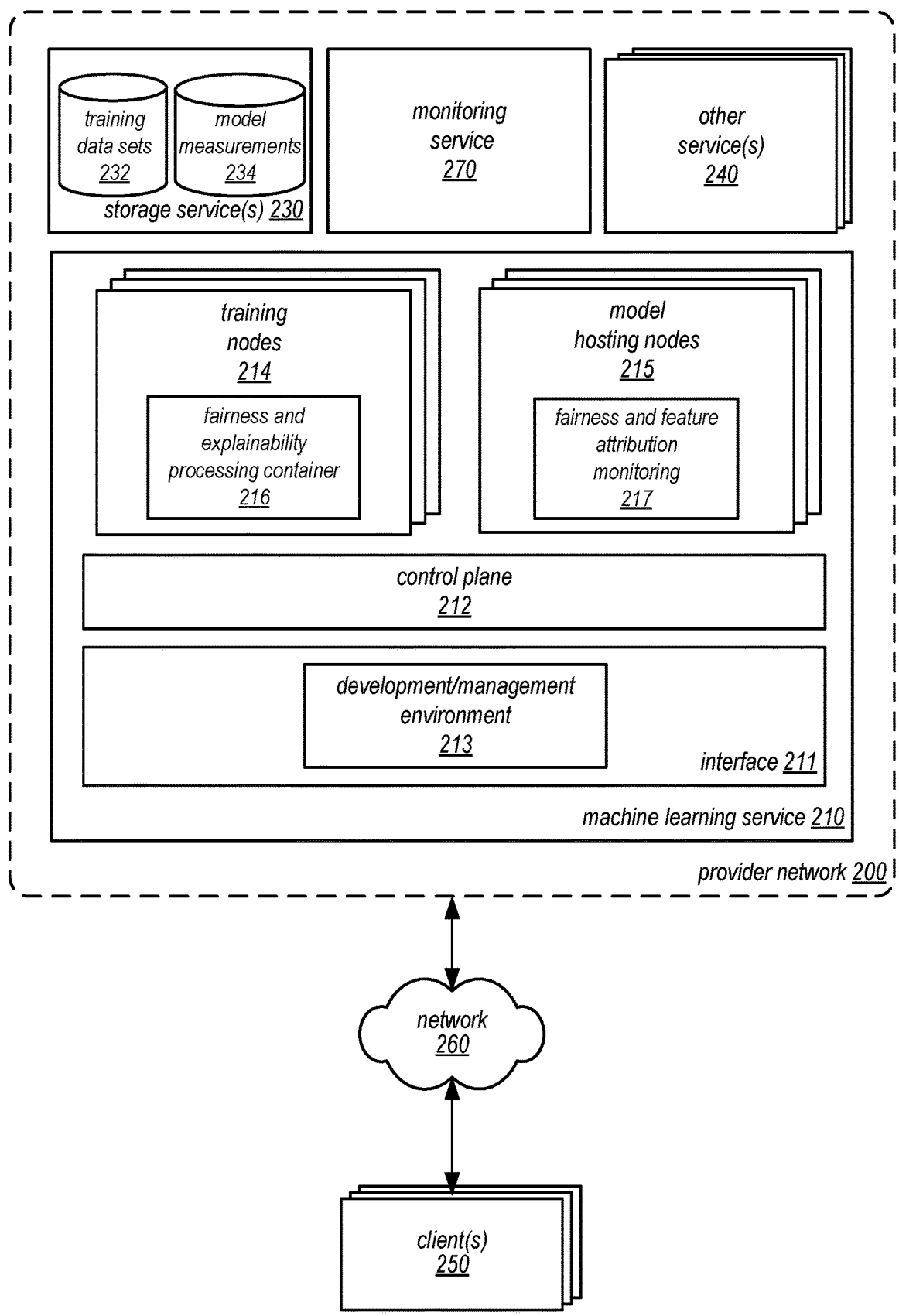
FIG. 2 illustrates an example provider network that may implement a machine learning service that performs staged bias measurements and feature attribution capture, according to some embodiments.

FIG. 2 illustrates an example provider network that may implement a machine learning service that performs staged bias measurements and feature attribution capture, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 17), needed to implement and distribute the infrastructure and services offered by the provider network 200, in one embodiment. In some embodiments, provider network 200 may implement various computing resources or services, such as machine learning service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 17 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning 210 may implement interface 211 to allow clients (e.g., client(s) 250 or clients implemented internally within provider network 200, such as a client application hosted on another provider network service like an event driven code execution service or virtual compute service) to compress, train, and deploy machine learning models (e.g., neural networks). For example, machine learning service 210 may implement interface 211 (e.g., a graphical user interface, programmatic interface that implements Application Program Interfaces (APIs) and/or a command line interface) may be implemented so that a client can submit, edit, or otherwise provide a training job for a machine learning model stored in storage service(s) that requests uses a fairness and explainability processing container 215, or enables fairness and feature attribution monitoring 217, and/or in other storage locations within provider network 200 or external to provider network 200 (e.g., on premise data storage in private networks). For example, interface 211 may include development and management environment 213, which may provide a training script or other code editor with various development tools to create, submit, and/or monitor machine learning pipeline with a training job and/or monitoring job, as discussed below. Development and management environment 213 may be a graphical interface, in some embodiments, and may provide an interface to past results generated for other models, in some embodiments. Interface 211 may allow a client to request the performance of training, deployment, or other machine learning service features, in various embodiments.

Machine learning service 210 may implement a control plane 212 to perform various control operations to implement the features of machine learning service 210. For example, control plane may monitor the health and performance of requests at different components, such as model training on training nodes 214 and model deployment on model hosting nodes 215. If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

Machine learning service 210 may implement model training nodes 214 to execute training jobs on various machine learning models using data sets, such as data sets 232 in storage services 230 across one or more training nodes (which may include one or more respective processing devices for training, such as GPUs). As discussed above with regard to FIG. 1, various bias metrics and/or feature attribution information may be stored in storage service(s) 230. In some embodiments machine learning service 210 may offer various virtual machines, instances, containers, images, or other applications hosted components that may implement fairness and explainability processing container 216 (or similar to features including fairness and explainability processing container 216), as discussed in detail below.

In various embodiments, machine learning service 210 may implement model deployment 215, which may deploy a trained machine learning model on resources (e.g., virtual compute instances or containers) to receive and return inferences or other results according to requests or other inputs to the deployed model. In various embodiments, monitoring features, including fairness and feature attribution monitoring 217 may be implemented.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Monitoring service 270 may receive, store, and/or aggregate various metrics from different services in provider network 200, which may then monitor and alert according to various conditions specified for the alerts. Various displays of metrics may be provided by monitoring service 270, in some embodiments.

Generally speaking, clients 250 may encompass any type of client that can submit network-based requests to provider network 200 via network 260, including requests for machine learning service 210 (e.g., a request to create a training job, interact with development and management environment 213, etc.). For example, a given client 250 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
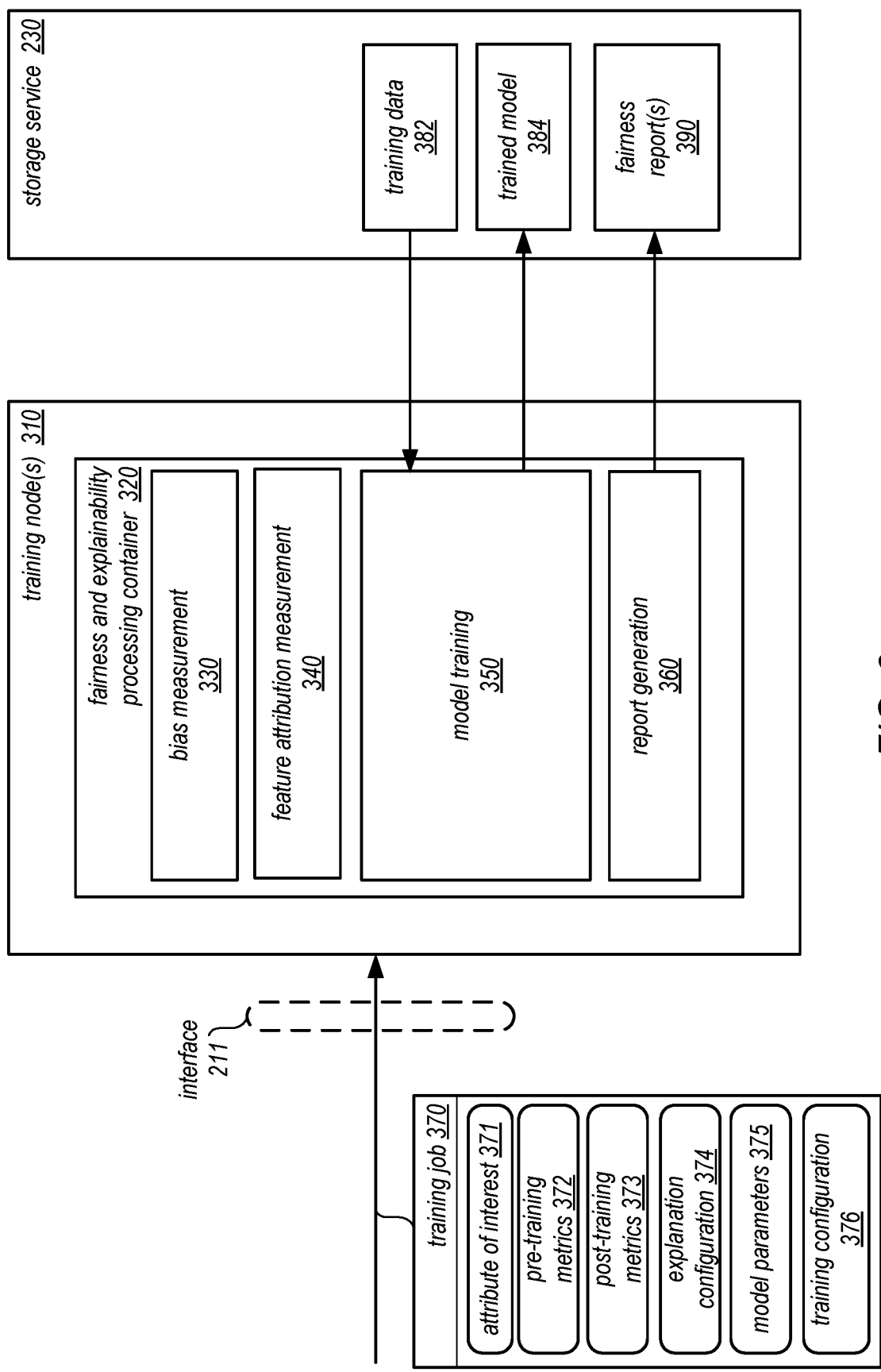
FIG. 3 illustrates a logical block diagram of an example fairness and explainability processing container, according to some embodiments.

Machine learning pipelines may be implemented on one or more computing resources, such as training nodes 214 (which may be a single or group of multiple nodes (e.g., a cluster)) executing a data processing application that can implement various machine learning frameworks (e.g., Tensorflow, Pytorch, MxNet, etc.). Different resources may be implemented or instantiated on behalf of a client of machine learning service to implement a machine learning pipeline 100 (or portions thereof). FIG. 3 illustrates a logical block diagram of an example fairness and explainability processing container, according to some embodiments. A container may be implemented as part of a virtualization framework, like Operating System virtualization. Other virtualization techniques, such as virtual machines, may be used to implement various features similar to those described in FIG. 3.

Training node(s) 310 may be similar to training node(s) 214. Fairness and explainability processing container 320 may deployed on training node(s) 310 in order to execute a training job 370 submitted via interface 211 (e.g., via development and management environment 213 which may be a development application that also support management operations with respect to deployed or trained machine learning models). Fairness and explainability processing container 213 may implement various libraries or features to support the execution of a training job 370.

Bias measurement 330 may support the determination of various pre-training and post-training bias metrics as discussed above with regard to FIG. 1. For example, training job 370 may specify various features, such as the attribute of interest (or sensitive attribute $X_r$) 371, along with various other input parameters:
 X: data set
 y: target attribute (label, ground truth)
 yhat: model prediction for the target attribute
 Gv: group variable (only for CDD/CDDL metric) along with one or more specified bias metrics,
selections of one or more pre-training metrics 372:
 Class (attribute of interest) imbalance (CI)
 Difference in proportions of labels (DPL)
 Kulback-Liebler divergence (KL),
 Jensen-Shannon divergence (JS), LP Norm (LP),
Total variation distance (TVD),
Kolmogorov-Smirnov distance (KS),
Conditional Demographic Disparity of labels (CDD): takes group variable (Gv) as additional argument.
selections of one or more post-training metrics 373:
Difference in proportions of predicted labels (DPPL)
Disparate Impact (DI)
Difference in Conditional Outcomes (DCO)
Recall difference (RD)
Difference in label rates (DLR)
Accuracy difference (AD)
Treatment equality (TE)
Conditional Demographic Disparity of predicted labels (CDDL): takes group variable (Gv) as additional argument Feature attribution measurement 340 may support the determination of various feature attribution measurements (e.g., using SHAP) as discussed above with regard to FIG. 1. A training job 370 may specify the various the configuration and/or selection of feature attribution as explanation configuration 374, in some embodiments. Input parameters for explanation configuration 374 may include a specified feature attribution technique (e.g., the SHAP technique or other supported feature attribution measurement technique), a reference data set of one or more rows in a data set or a data object (e.g., file, pathway, or location of the object), a parameter to indicate how to generate a default reference data set if one is not provided, aggregation parameter for global explanation values, such as mean, mean squared, or median, a parameter to log model predictions used for computing feature attribution, etc. In some embodiments, feature attribution measurement 340 may create a shadow endpoint or other interface to use to submit inference requests to determine feature attribution measurements, in some embodiments. Feature attribution measurement 340 may perform cleanup and remove the shadow endpoint when finished, in some embodiments. As discussed in detail below with regard to FIGS. 5 and 14, feature attribution measurement 340 may perform distribution calculation of feature attribution measurement.

Model training 350 may implement various machine learning frameworks to train various types of machine learning models. Training job 370 may include various information to inform the execution of machine learning model training, such as other information to execute a training job, such as model parameters 375 (e.g.,) and other training configuration information 376 (e.g., hyper parameters, training time limitations, association with a trial run, etc.). Model training 350 may obtain training data 382, train the machine learning model and store the trained model 384 in storage service 230, in various embodiments.

In some embodiments, training job 370 may be associated with one or more trials the machine learning training on the machine learning model. Each trial may have associated bias and/or feature attribution metrics as specified in training job 370 such that different views or reports, as discussed in detail below with regard to FIGS. 6-8 and 15 may be generated. Report generation 360 may be implemented to store various bias metrics for pre and post training, as well as feature attribution measurements as part of fairness report(s) 390 in storage service 230. In this way, other components, systems, or other nodes in machine learning service 210 can implement them.

Figure 4:
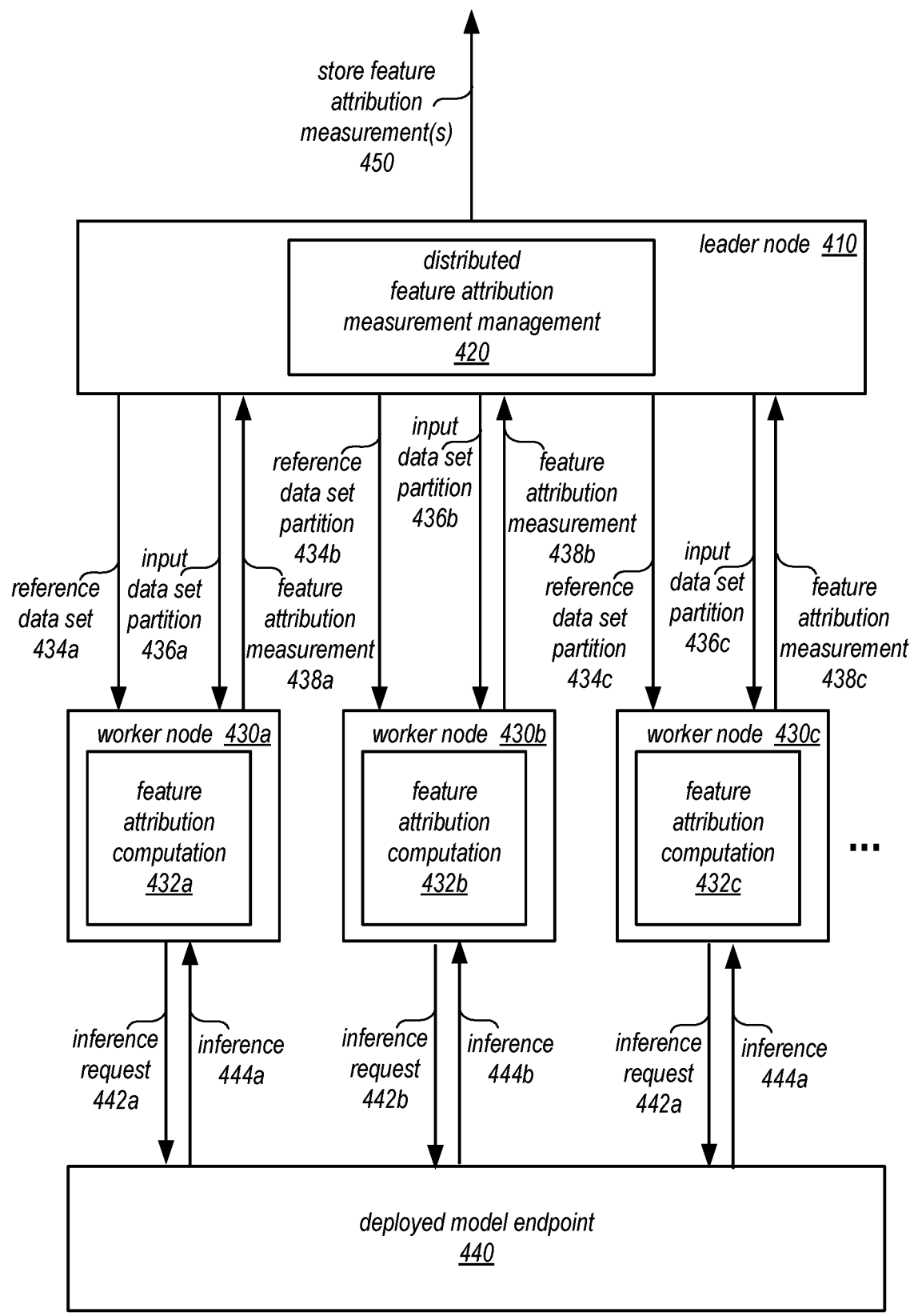
FIG. 4 illustrates a logical block diagram of distributed computation of feature attribution for a trained machine learning model, according to some embodiments.

In some embodiments, the scale of determining feature attribution values may grow very large, beyond the capacity of an individual node to complete in a timely fashion. Scalable computation techniques, therefore, may be implemented to determine feature attribution values. Feature attribution measurement 340 may implement such scalable techniques in order to improve performance of feature attribute calculations over large input data sets. FIG. 4 illustrates a logical block diagram of distributed computation of feature attribution for a trained machine learning model, according to some embodiments.

Leader node 410 may be one of a cluster of training nodes (e.g., 310 or 214), which may be implement distributed data processing applications or systems (e.g., Apache Spark), which may support interactions to coordinate distributed processing jobs like feature attribution calculations amongst a multiple worker nodes, such as worker nodes 430a, 430b, and 430c. In various embodiments, a number of nodes in a cluster may be determined according to a configuration parameter 376 in training job 370. Leader node 410 may implement distributed feature attribution measurement management 420, in various embodiments, which may perform techniques similar to those discussed below with regard to FIG. 14. For example, distributed feature attribution measurement management 420 may provide a reference data set, such as reference data set 434a, 434b, and 434c, to each worker node 430. Reference data set 434, as discussed above, with regard to FIG. 3, may be specified as part of a training job, in some embodiments (e.g., one or more rows of a data set), or may be determined by feature attribution management 340, in some embodiments.

When a feature attribution measurement is to be generated (e.g., for a global or local feature attribution measurement), distributed feature measurement management 420 to partition the input data set to test (e.g., the training data set used to train the machine learning model). For example, distributed feature measurement management 420 may apply various heuristics to partition the data set in an efficient way to calculate feature attributions (e.g., by dividing an input data set to balance a number of rows amongst each node, by dividing an input data set to along input data set file, object, data block boundaries, etc.). Distributed feature attribution measurement management 420 may assign input data set partitions to different worker nodes, as indicated at 436a, 436b, and 436b. In some embodiments, the input data set partition may be directly provided, or in some embodiments, input data set partition 436 may be an instruction to read the partition from a storage location (e.g., to read from an input data set from storage service 230), which may allow for the input data set to be obtained in parallel by worker nodes 430.

In various embodiments, feature attribution computation, such as feature attribution computation 432a, 432b, and 432c, may be implemented at each node (e.g., utilizing SHAP-based), to determine the different respective feature attribution measurements 438a, 438b, and 438c. For each instance of input data set being measured (e.g., each row of a data set), worker nodes 430 may submit a respective inference request 442a, 442b, and 442c, to a deployed model endpoint 440, in some embodiments. For example, deployed model endpoint 440 may be also hosted on the same cluster of nodes (e.g., by a node that also implements distributed feature attribution measurement 420) as a shadow endpoint created by fairness and explainability processing cluster 320 to generate inferences based on the trained model for which feature attribution is being determined. In some embodiments, a separately hosted and/or deployed version of the machine learning model (e.g., on model hosting nodes 215) may serve the machine learning model as the deployed model endpoint 440. An inference may be respectively generated for each inference request from each worker node 430, as indicated at 444a, 444b, and 444c, and returned to worker nodes 430, to generate and return a feature attribution measurement, as indicated at 438a, 438b, and 438c to leader node 410.

Leader node 410 may combine and store the respective feature attribution measurements, as indicated at 450. For example, leader node 410 may calculate the mean, mean squared, or median of the combined feature attribution measurements. The stored feature attribution measurement(s) 450 may be written as part of fairness report 390 and/or other storage object for a training job.

Figure 5:
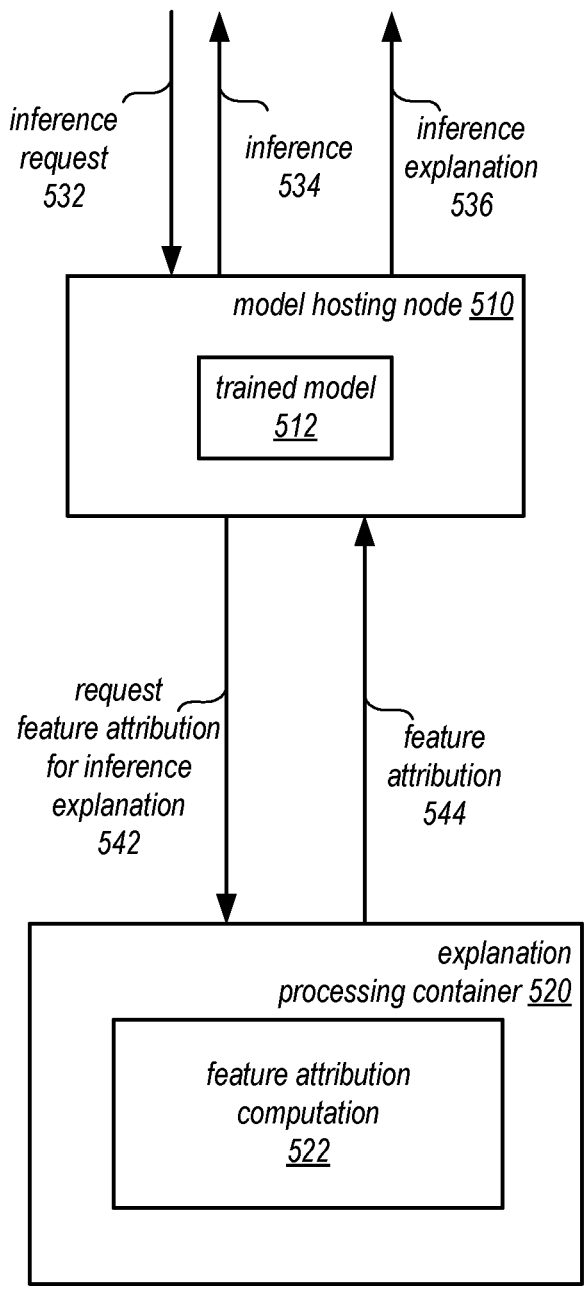
FIG. 5 illustrates a logical block diagram of feature attribution computations for explaining specific inferences for a trained machine learning model, according to some embodiments.

As discussed above with regard to FIG. 1, another way in which understanding of machine learning models can be increased, is through the use of local feature attribution measurements, which may provide an explanation for a particular inference generated by a trained machine learning model. FIG. 5 illustrates a logical block diagram of feature attribution computations for explaining specific inferences for a trained machine learning model, according to some embodiments. Model hosting node 510, which may be similar to model hosting node(s) 215 discussed above with regard to FIG. 2. Inference requests 532 may be made to model hosting node 510 (e.g., from various client applications) in order to provide an inference 534 using trained model 512. In some embodiments, either automatically (or in response to another request) model hosting node 510 may provide an inference explanation 536 (e.g., to include in a result displayed for an end user of the client application or in response from a client application to provide an inference explanation in the event that an explanation for a particular decision or other action take as a result of inference 534 is desired (e.g., to satisfy a user inquiry as to why the application made a decision that it did)).

In order to provide inference explanation 536, model hosting node 510 may send a request for feature attribution for an inference explanation 542, in various embodiments, to explanation processing container 520. In some embodiments, explanation processing container 520 may be a fairness and explainability processing container (e.g., 320), or in other embodiments may be a container hosted on different node(s) that is dedicated to handling feature attribution requests for specific inferences. Explanation processing container 520 may include feature attribution computation 522 (e.g., as part of a same library that implements feature attribution measurement 340 in FIG. 3) in order to provide a local feature attribution measurement. For example, feature attribution compilation 522 may determine SHAP value(s) for a reference data set specified for trained model 512 (e.g., as part of a training job to create the model) in order to determine a comparison to explain the differences with the specific inference. The feature attribution may be returned, as indicated at 544, to support model hosting node 510 returning inference explanation 536, in some embodiments.

Because bias metrics and feature attribution is integrated into a machine learning pipeline, as discussed above with regard to FIGS. 1 AND 3, various interfaces may be used to provide an end-to-end view of fairness concerns as well obtain further analysis with respect to a global understanding of a trained machine learning model. One such interface may be implemented as part of a development application, like development management environment 213, discussed above with regard to FIG. 2. Development management environment 213 may provide an interface with a rich set of features and tools for creating, managing, understanding, and deploy machine learning models, offering an end-to-end view of machine learning pipeline, such as the machine learning pipeline 100 discussed above. Users developing machine learning models can quickly move between various stages of a machine learning pipeline in order to write code, track experiments, visualize data, and perform debugging and monitoring within development management environment 213, increasing user productivity. Moreover, as the need to incorporate fairness aware development and explainability into machine learning applications continues to grow in importance for ethical, regulator, and other reasons as discussed above with regard to FIG. 1, providing the capability to easily access such information in the same environment in which the training job, for instance, that caused a machine learning model to be created (or a set of different training jobs associated with different experiment trials) may increase the opportunities to mitigate and better account for bias in machine learning models. Accordingly, development management environment 213 may implement techniques to generate various views of the bias metrics and feature attribution calculated as part of a machine learning pipeline created and managed via development management environment 213, in some embodiments.

Figure 6:
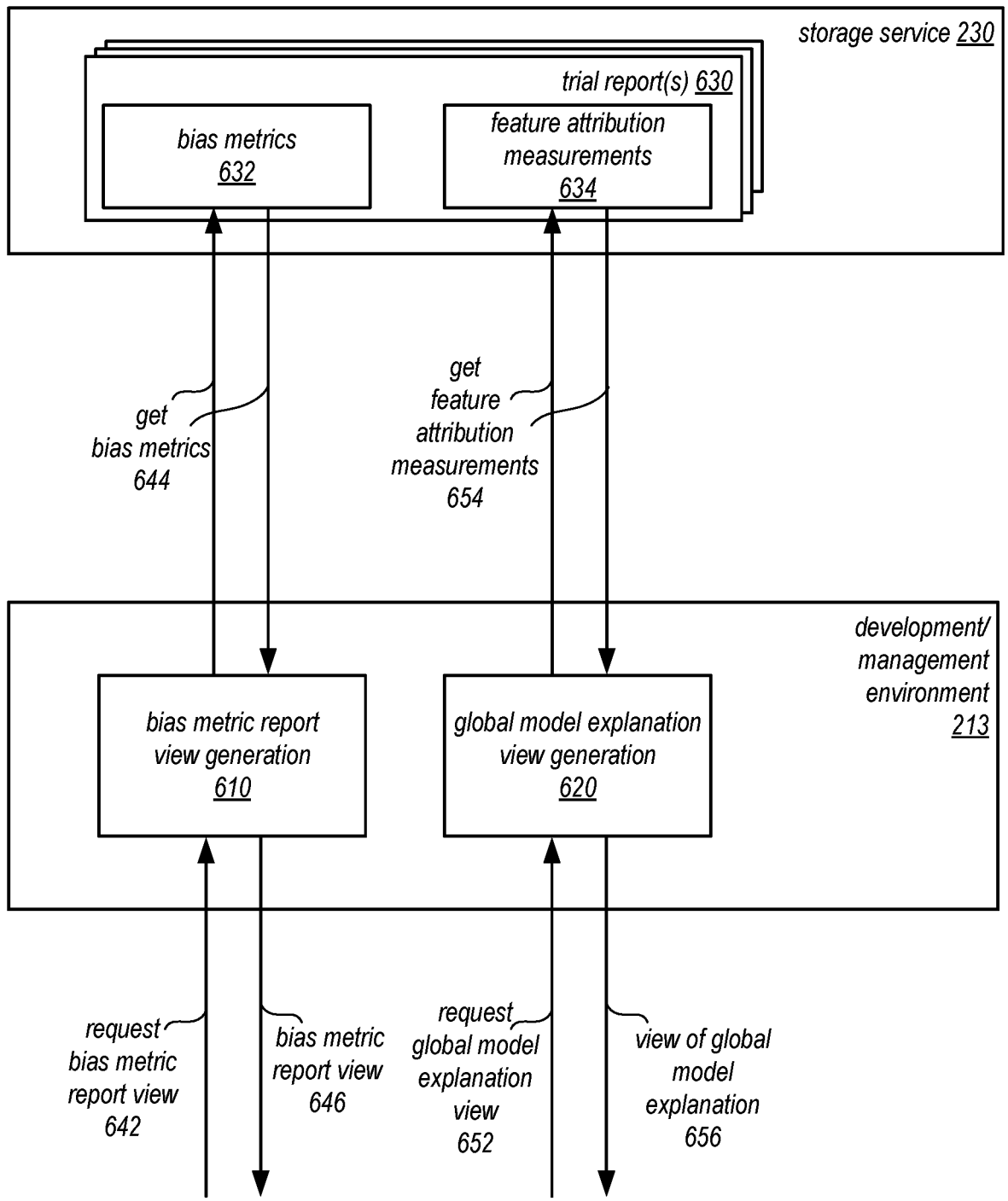
FIG. 6 illustrates a logical block diagram of a development and management environment generating views for fairness and explainability, according to some embodiments.

FIG. 6 illustrates a logical block diagram of a development and management environment generating views for fairness and explainability, according to some embodiments. Development management environment 213 may implement different view generation features to understand and/or access the information captured in a machine learning pipeline for a machine learning model. For example, development and management environment 213 may implement bias metric report view generation 610 to handle a request for a view of a bias metrics report, as indicated at 642. Bias metric report view generation 610 may identify the storage location in a backend store, such as storage service 230 that stores the bias metrics generated and stored for the machine learning model at various stages with the request 642. For example, the request 642 may be a request for bias metrics for a specific experiment trial (e.g., by identifier number, name, or other identifier). Bias metric report view generation 610 may read or otherwise get 644 the bias metrics 632 from the corresponding trial report 630 and use the information (e.g., recorded in a format such a JSON or other interpretable format) to generate the requested view to provide, as indicated at 646.

Figure 8:
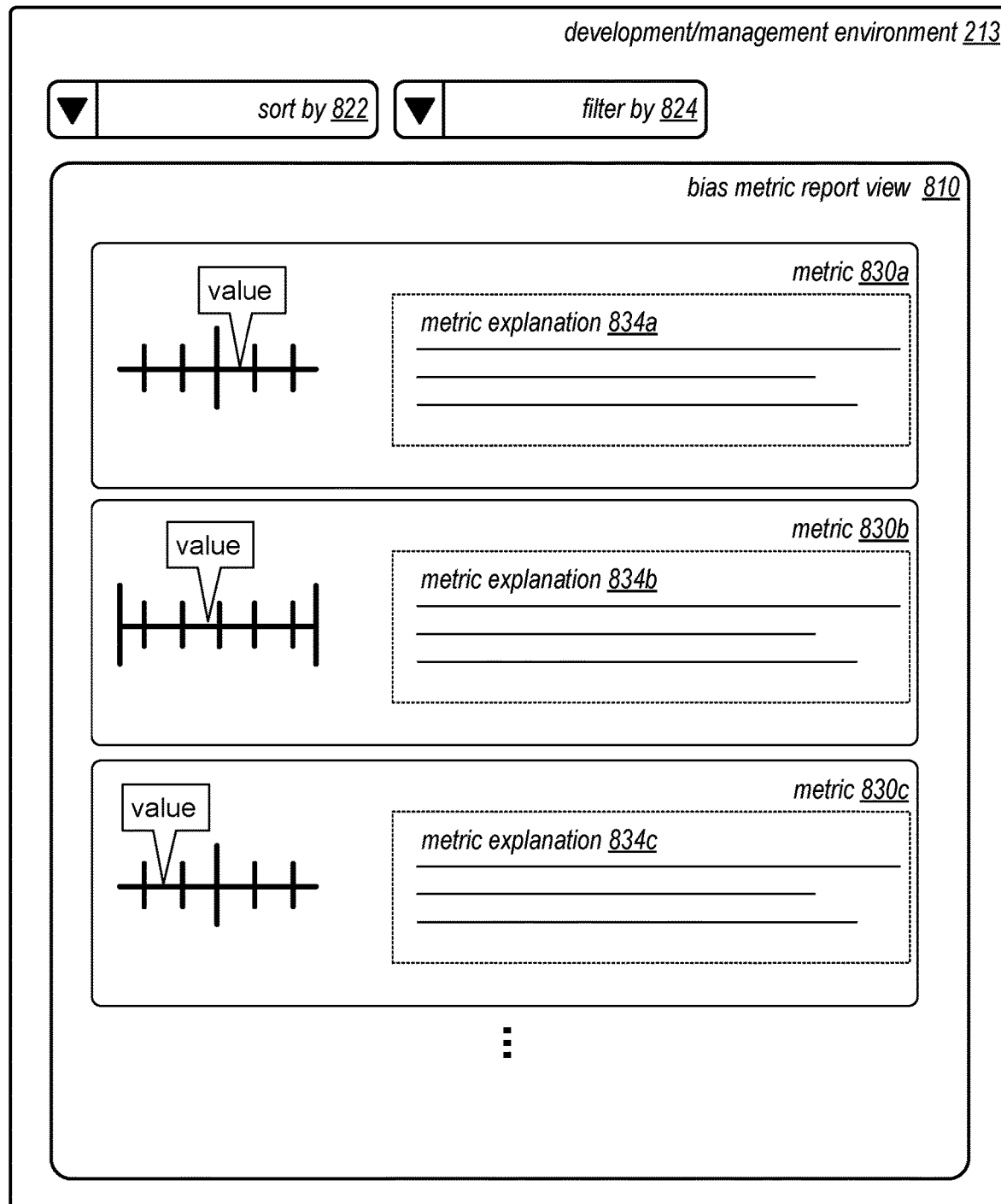
FIG. 8 illustrates an example bias metric view for a machine learning pipeline, according to some embodiments.

For example, FIG. 8 illustrates an example bias metric view for a machine learning pipeline, according to some embodiments, that may be generated and provided via development and management environment 213. For example, bias metric report view 810 may display the various metrics that were specified in the training job request, such as metrics 830a, 830b, 830c, and so on. As part of the metric display 830, the value of the metric may be displayed along with an explanation, as indicated at 834a, 834b, and 834c, respectively. As discussed above with regard to FIG. 1, some values may be specified within a particular range. Individual metric views 830 may include a visual display of the value range, and the location of the particular metric within that value range, in some embodiments, in order to provide an intuitive understanding the scale indicated by that metric (e.g., how close to one end or another is the metric). Various user interface elements to rearrange or modify the display, such as sorting metrics, as indicated at 822, and/or filtering metrics, as indicated at 824 may be provided. In some embodiments, alternate views of metrics, such as a display of a chart that recites the metric values without ranges.

Turning back to FIG. 6, development and management environment 213 may implement global model explanation view generation 620. Global model explanation view generation 620 handle a request for a view of a global model explanation, as indicated at 652. Global model explanation view generation 620 may identify the storage location in a backend store, such as storage service 230 that stores the feature attribution measurement(s) associated with the request 652. For example, the request 652 may be a request for feature attribution measurements for a specific experiment trial (e.g., by identifier number, name, or other identifier). Global model explanation view generation 620 may read or otherwise get 654 the feature attribution measurements 634 from the corresponding trial report 630 and use the information (e.g., recorded in a format such a JSON or other interpretable format) to generate the requested view to provide, as indicated at 656.

Figure 7:
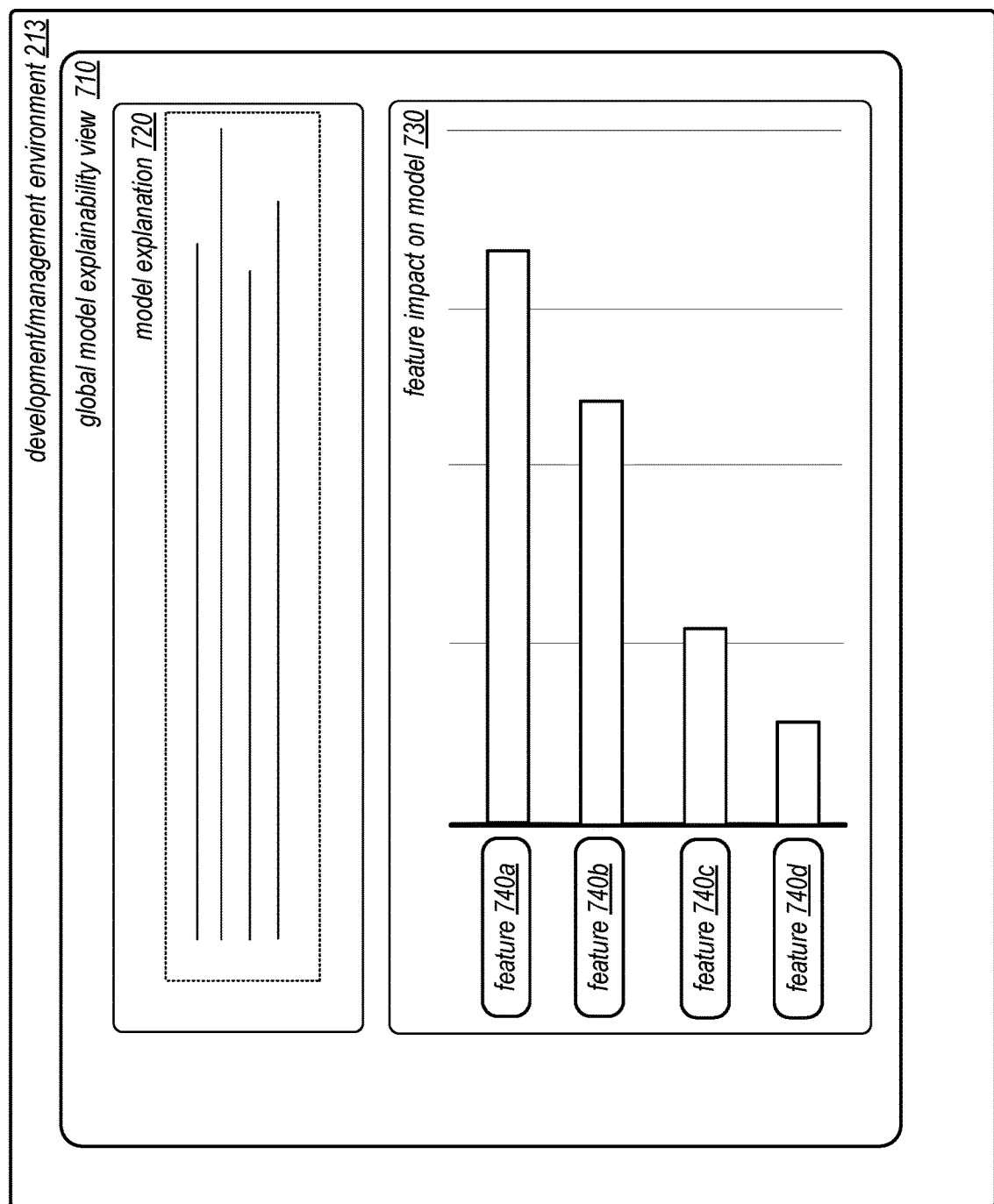
FIG. 7 illustrates an example explainability view for a trained model, according to some embodiments.

FIG. 7 illustrates an example explainability view for a trained model, according to some embodiments. Development and management environment 213 may provide a global model explainability view 710, which may show an explanation of the model 720, as well as an illustrate of the impact different features have on the model, as indicated by bar graph 730 for features 740*a*, 740*b*, 740*c*, and 740*d*. For example, the SHAP values for each feature (e.g., mean, mean squared, and/or median) may be used to order the features 740.

As discussed above with regard to FIG. 1, techniques for monitoring bias metrics for attributes of interest as well as feature attributions indicative of explainability may enhance the understanding of the behavior of a trained machine learning model by recognition scenarios when the behavior of a model has drifted or moved away from fair or explainable outcomes. For instance, although care may be taken in the development of a machine learning model to account for fairness pre, during, and post-training stage in machine learning model develop using the techniques discussed above, exposure to a larger input data set as a result of deployment (e.g., a very large "real world" data set vs. a training data set) may expose biases that were not identified earlier in the machine learning pipeline. Similarly, the importance of features may change when exposed to larger input data set for similar reasons. In order to ensure that problematic scenarios exposed by such shifts are detected and addressed, model monitoring for fairness and explainability may be implemented.

Figure 9:
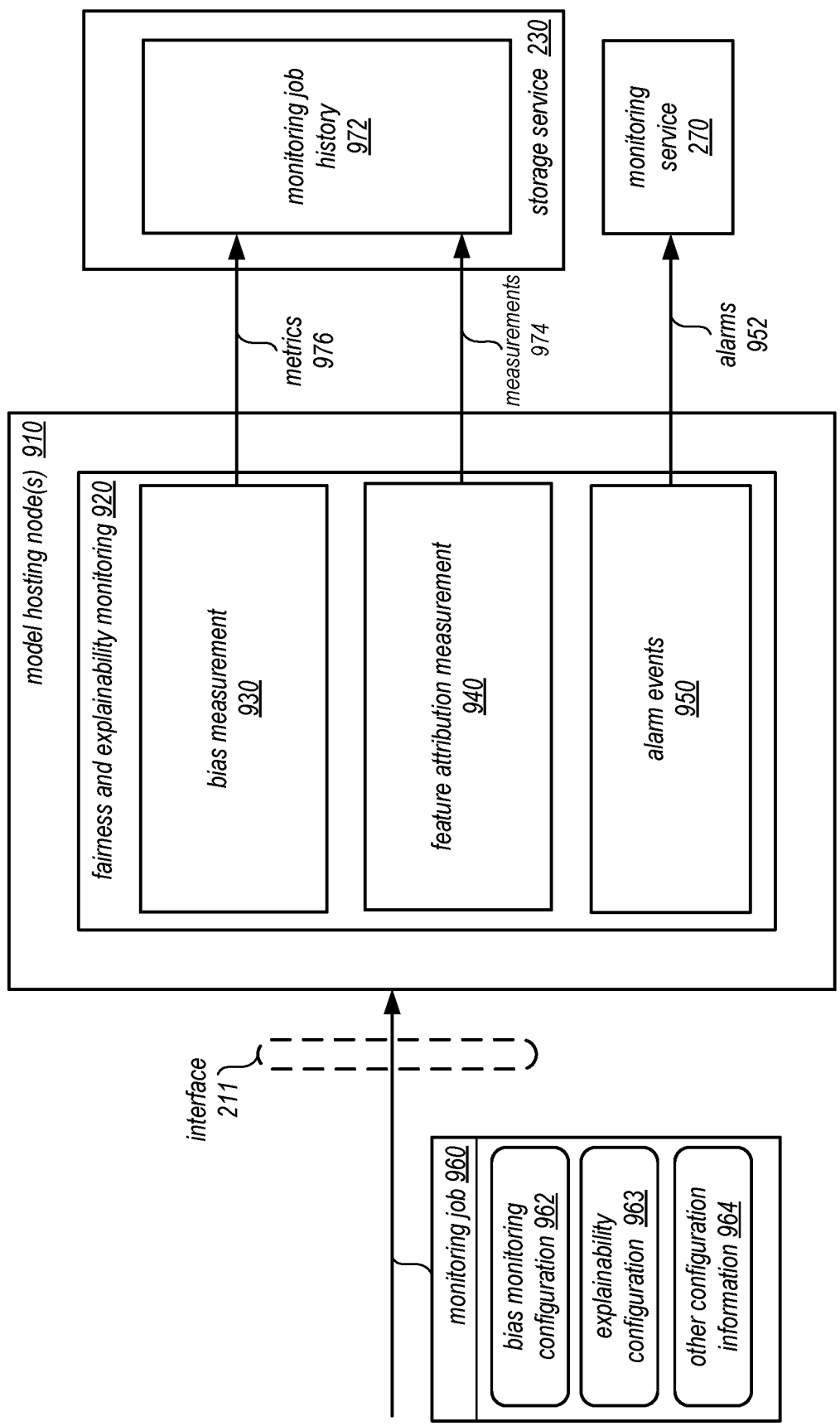
FIG. 9 illustrates a logical block diagram of an example fairness and explainability monitoring feature, according to some embodiments.

FIG. 9 illustrates a logical block diagram of an example fairness and explainability monitoring feature, according to some embodiments. Fairness and explainability monitoring 920 may be implemented as library, container, image, process or other component of model hosting node(s) 910, which may be similar to model hosting node(s) 215, discussed above. Fairness and explainability monitoring 920 may receive a monitoring job 960 specified via interface 211 of a machine learning service (e.g., via development and management environment 213), which may create a job to monitor bias metrics using bias measurement feature 930 or feature attribution measurement 940. Alarm events 950 may detect scenarios where monitored bias metrics or feature attribution may diverge from a reference data set, exceed a threshold, or otherwise satisfy an alarm criteria to trigger an alarm 952, which may be sent to monitoring service 270 to notify or display to a user or trigger a responsive action.

Monitoring job 960 may include information to configure the performance of monitoring job 960. For example, monitoring job 960 may include information such as bias monitoring configuration 962 (e.g., attribute, bias metrics for the attribute to be monitored, threshold for alarm, reference data set for comparison, etc.), explainability configuration 963, and/or other configuration information 964 (e.g., a schedule for executing the monitoring job, such as every X hour of a 24 hour period, the identifier of a deployed machine learning model to monitor, etc.).

Monitoring job 960 may be specified according to an API for fairness and explainability monitoring 920, in some embodiments, which may support the different types of monitoring. For example, bias monitoring configuration 962 may support a monitoring job 960 that performs bias drift monitoring in some embodiments. Similarly, monitoring job 960 may support feature model explainability monitoring according to explainability configuration 963.

Bias measurement 930 may perform a bias monitoring job 960, in some embodiments. Bias measurement 930 may determine bias metrics for a specified attribute (e.g., the same attribute specified in a training job for the machine learning model) and compare those bias metrics with a threshold value (e.g., specified in monitoring job) or check for divergence from a reference data set for the bias metric (e.g., an amount of change from a bias measure determined when the model was trained). In this way, drift in bias may be detected to expose scenarios where a bias metric illustrates bias when exposed to different data than was used in a training data set. Similar to the bias metric computations discussed above with regard to FIGS. 1 and 3, bias measurement 930 may generate bias metrics using post-training metrics (e.g., using an inference plus other available data). These metrics 976 may be stored in monitoring job history 972, in some embodiments, in order to provide views generated for monitoring jobs for bias metrics.

Figure 10A:
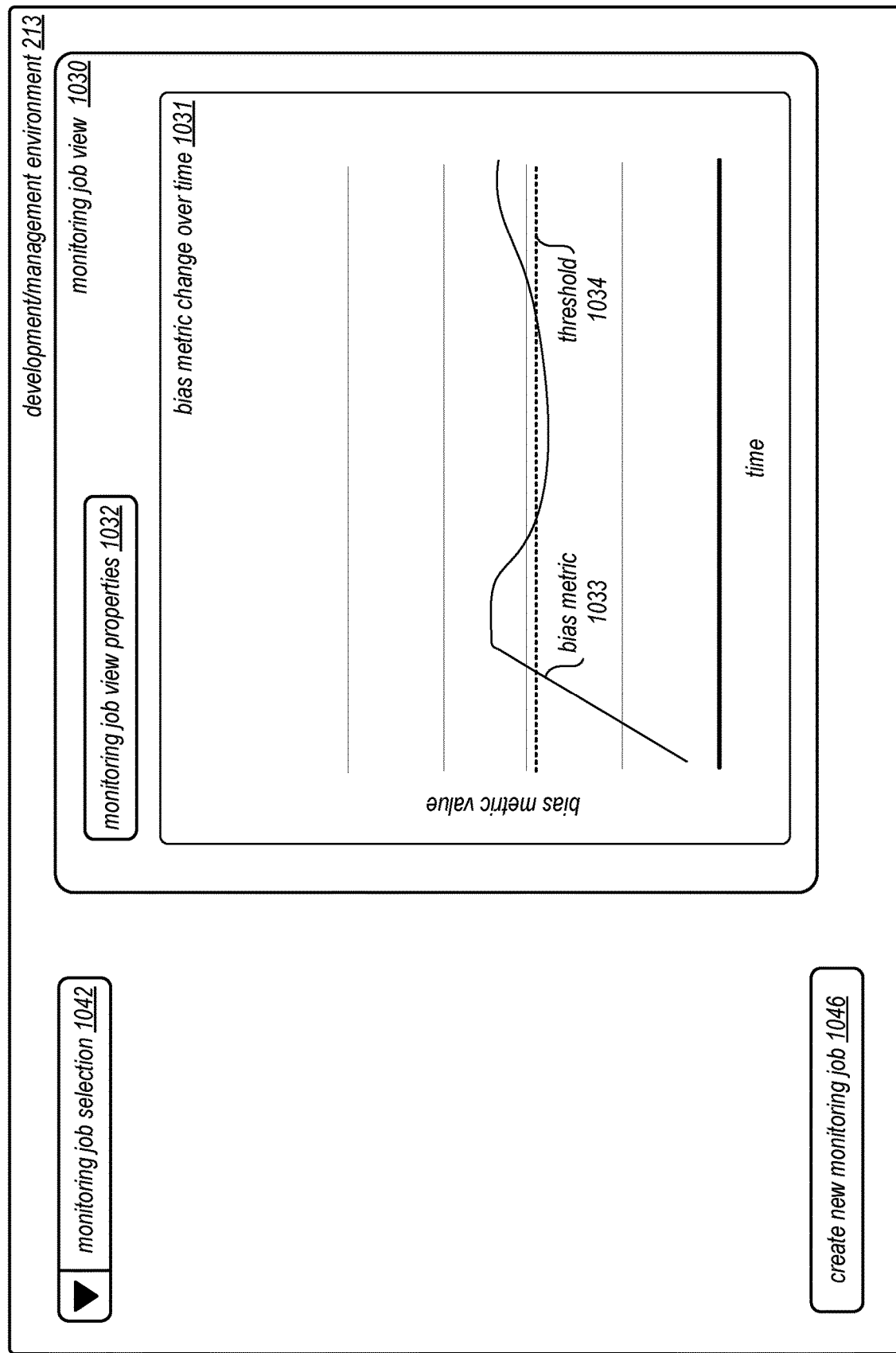
FIGS. 10A-10C illustrate example monitoring job views, according to some embodiments.

For example, as illustrated in FIG. 10A, monitoring job view 1030 may be generated as part of development and management environment 213. Monitoring job view 1030 may provide a display of bias metric change over time 1031, indicating the bias metric 1033, as well as other monitoring features, like threshold 1034. User interface elements to configure the view, such as monitoring job view properties 1032 may be implemented which may allow for subsets of bias metrics for feature data to be displayed (e.g., age range of 20 to 50, gender=female, etc.).

Monitoring job 960 may support enabling explainability monitoring jobs, in some embodiments, based on explainability configuration 963. For example, explainability configuration 963 may support monitoring to detect global model feature attribution drift. Fairness and explainability monitoring 920 may obtain various reference feature attributions, from training reports or past measurements computed by feature attribution measurement 940 (which may perform global feature attribution measurement according to the techniques discussed above with regard to FIGS. 1 and 3, such as by using SHAP values and generating comparisons using NDCG). These measurements 974 may be stored in monitoring job history 972, in some embodiments, in order to provide views generated for monitoring jobs for feature attribution measurements.

Figure 10B:
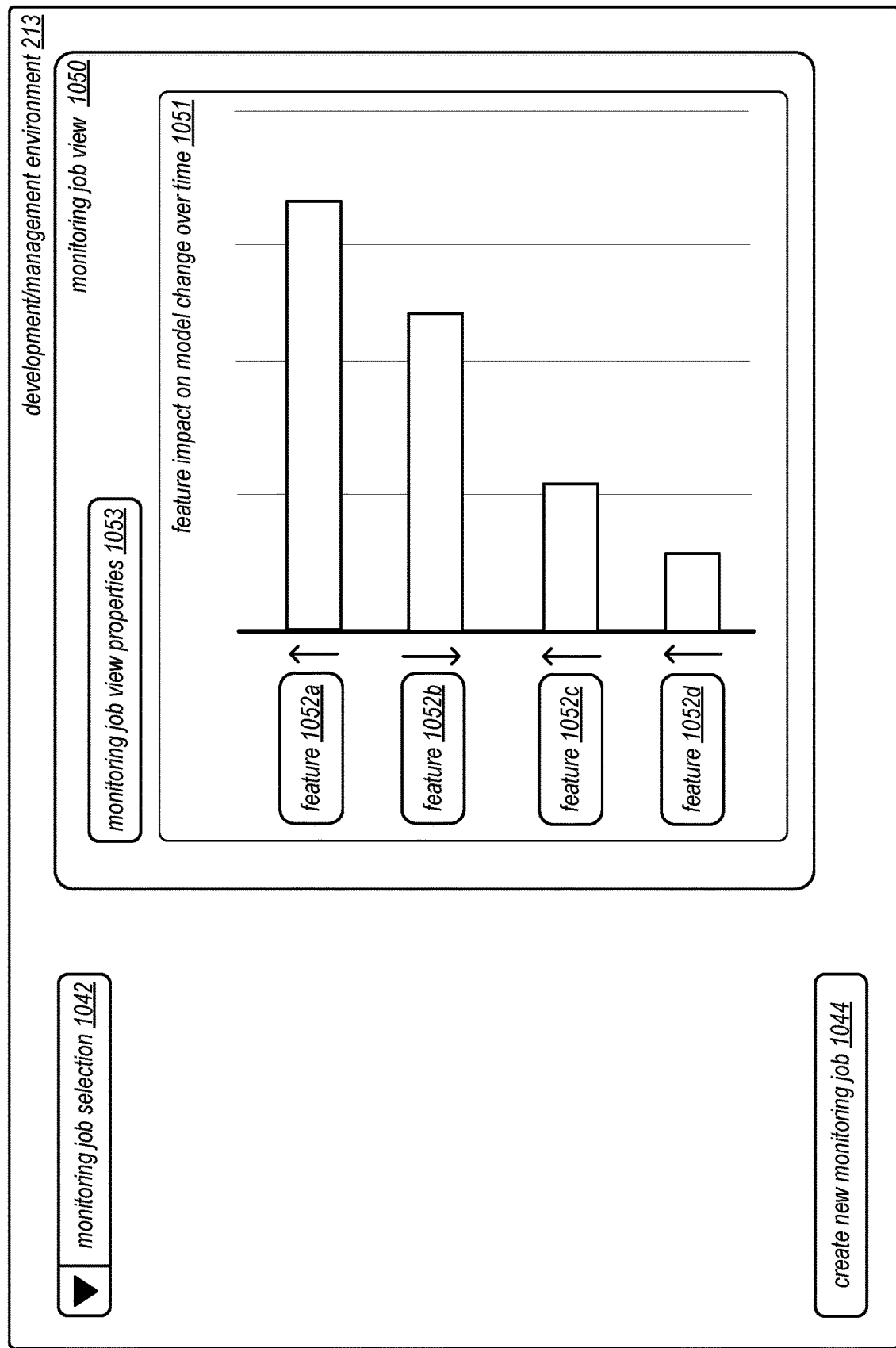

The collected measurements may be used to generate various views of feature attribute monitoring, in some embodiments. FIG. 10B illustrates an example monitoring job view 1050 for feature attribution measurements. For example, monitoring job view 1050 may implement illustrate feature impact on model change over time 1051. For example, each feature, such as features 1052*a*, 1052*b*, 1052*c*, and 1052*d*, may be illustrated in order of impact. Moreover, as indicated in FIG. 10B, each feature may have an arrow or other indication to show change in the feature's 1052 position relative to a previous measurement. Monitoring job view properties 1053 may allow for a user to select, for instance, the reference time period used for comparison (e.g., the training global feature attribution value generated after training and before deployment or a later period), as well as range of later measurements when compared with the reference time period to display.

Figure 10C:
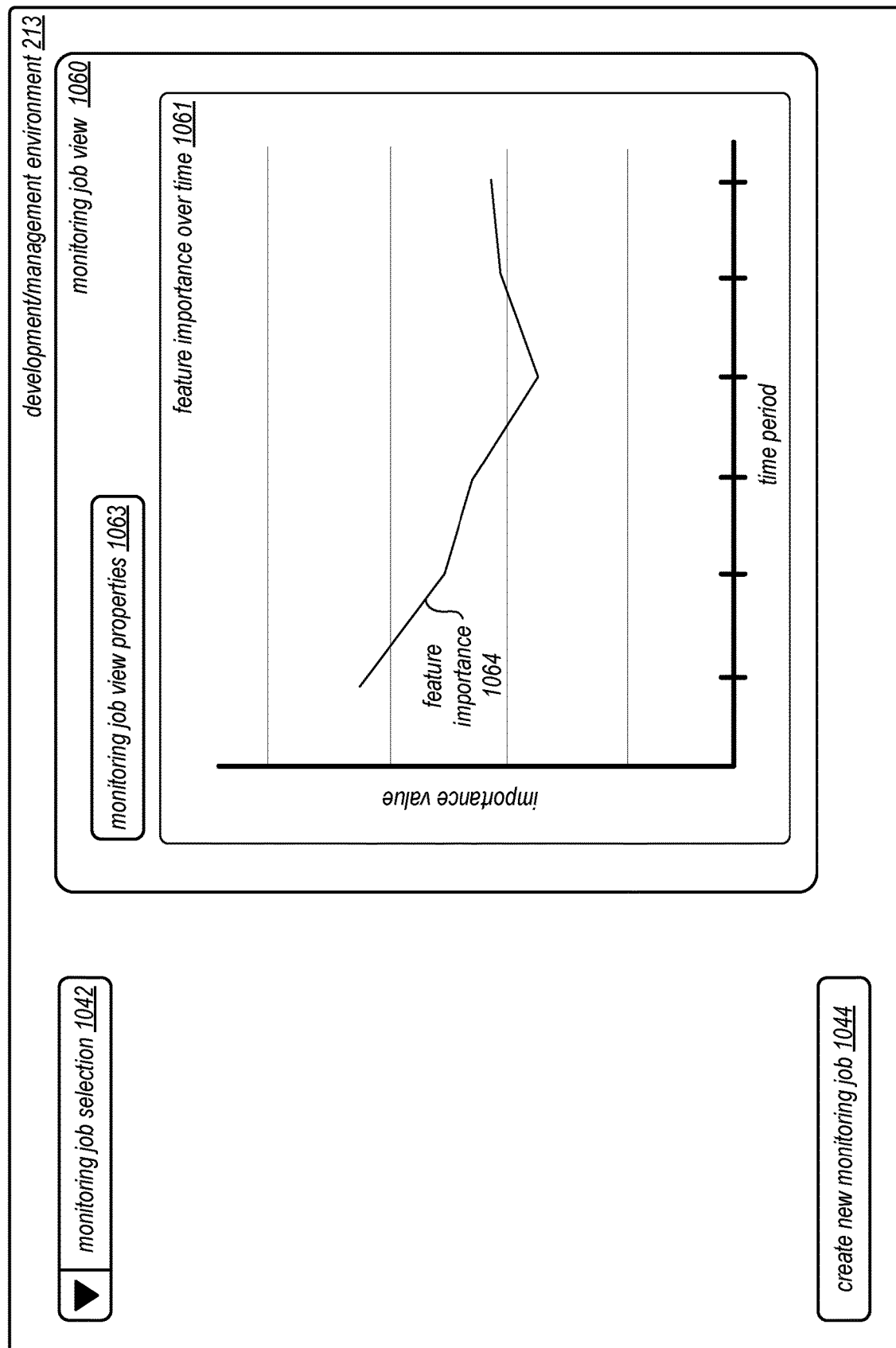

FIG. 10C illustrates another example monitoring job view 1060 for feature attribution measurements. For example, monitoring job view 1060 may implement illustrate feature importance change over time 1061. For example, a selected feature in monitoring job view properties 1063 to show that features importance 1064 at different points in a selected time period. Importance value may be a feature attribution value or may be a rank with respect to other features in the trained machine learning model. Monitoring job view properties 1063 may allow for a user to select, for instance, the time period used for display, the type of importance value (e.g., rank or feature attribution score).

As illustrated in FIGS. 10A-10C, development and management environment 213 may implement user interface elements to select from various submitted monitoring jobs 960, as indicated at element 1042. In some embodiments, a display or listing of currently enabled monitoring jobs for bias metrics and/or feature attribution may be provided, in some embodiments. Individual ones of these monitoring jobs may then be selected for display.

As illustrated in FIGS. 10A-10C, development and management environment 213 may implement user interface elements to create a new monitoring job, as indicated at 1044. For example, the various features for enabling a monitoring job for bias metrics (e.g., attribute of interest, specific bias metrics to monitor, threshold and/or divergence threshold from a reference data set for triggering an alarm, etc.), or feature attribution (e.g., specified reference data set, schedule, divergence threshold from the reference data set for triggering an alarm, etc.) may be submitted via the element 1044, which may then create and submit a corresponding monitoring job to the appropriate model hosting node for the machine learning model to monitor.

Although FIGS. 2-10C have been described and illustrated in the context of a provider network implementing a machine learning service, the various components illustrated and described in FIGS. 2-10C may be easily applied to other machine learning systems that execute training jobs for machine learning models. As such, FIGS. 2-10C are not intended to be limiting as to other embodiments of automatic partitioning of machine learning models for training across multiple devices.

Figure 11:
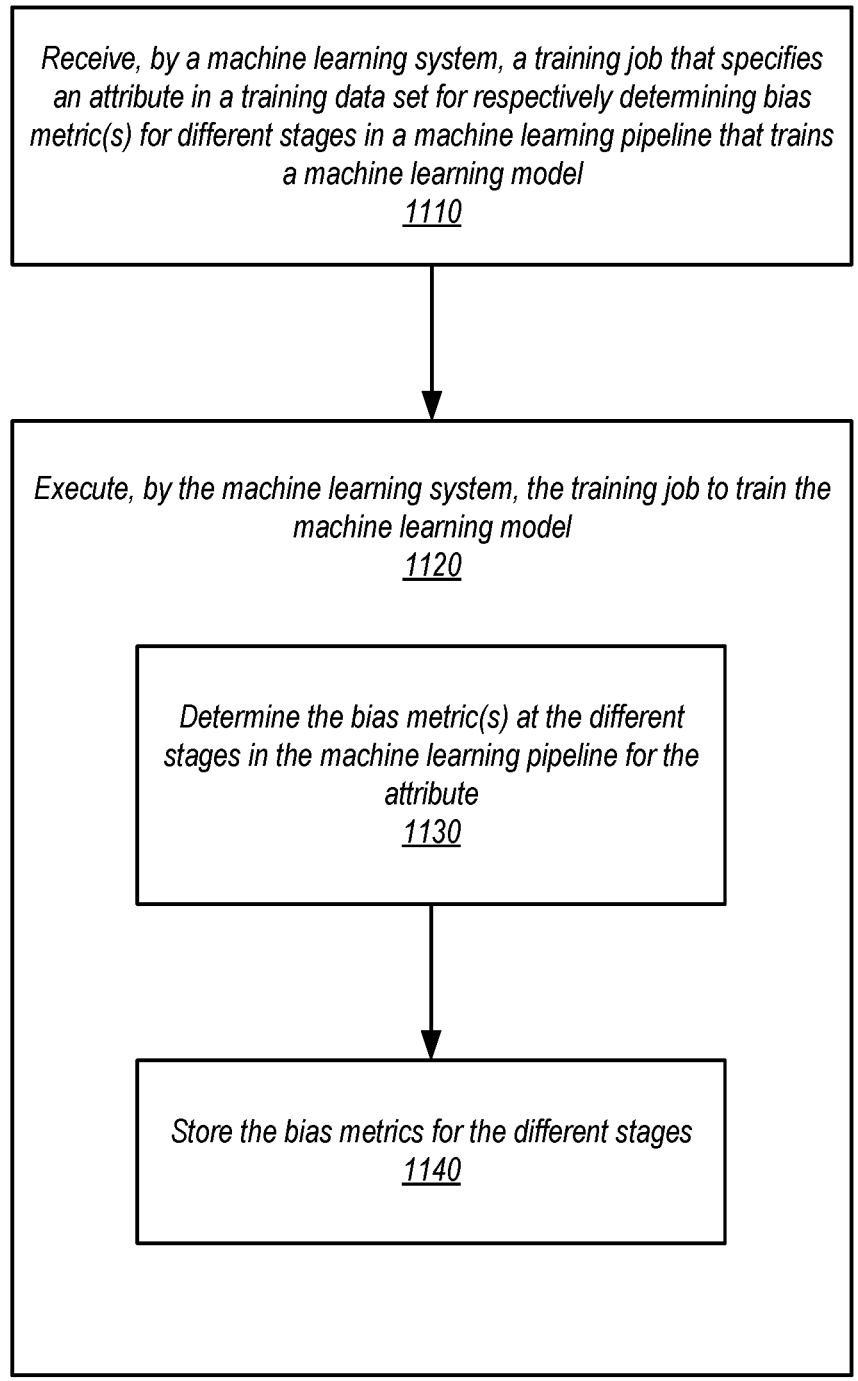
FIG. 11 is a high-level flowchart illustrating various methods and techniques for staged bias measurements in machine learning pipelines, according to some embodiments.

FIG. 11 is a high-level flowchart illustrating various methods and techniques for staged bias measurements in machine learning pipelines, according to some embodiments. As indicated at 1110, a training job may be received that specifies an attribute in a training data set for respectively determining bias metric(s) in a training data set for respectively determining bias metric(s) for different stages in a machine learning pipeline that trains a machine learning model may be received, in various embodiments. For example, the training job interfaces discussed above with regard to a fairness and explainability processing container 320 in FIG. 3 may support determining the various bias metrics discussed above with regard to FIG. 1 for a pre-training stage and a post-training stage. In various embodiments, other features for the training job, such as a parameters specifying an input data set, target attribute (label, ground truth), model prediction for the target attribute, and/or group variable (for CDD/CDDL metric) may also be specified.

As indicated at 1120, the machine learning system may execute the training job to train the machine learning model, in various embodiments. For example, the various stages discussed above with regard to training a machine learning model may be performed, including preparing training data and applying machine learning training techniques. Integrated as part of the performance of the training job may be the bias metric calculations specified for the different stages of the machine learning pipeline, such as a pre-training stage, during the training stage, and a post-training stage. As indicated at 1130, the bias metric(s) may be determined at the different stages. As indicated at 1140, the bias metrics may be stored for the different stages, in some embodiments. As discussed above, the training job may be associated with an experiment trial, and thus the bias metrics may be stored as part of a report associated with the trial metric, in some embodiments. A backend store or storage location may be identified (or specified in the training job) for the one or more bias metrics, in some embodiments.

Figure 12:
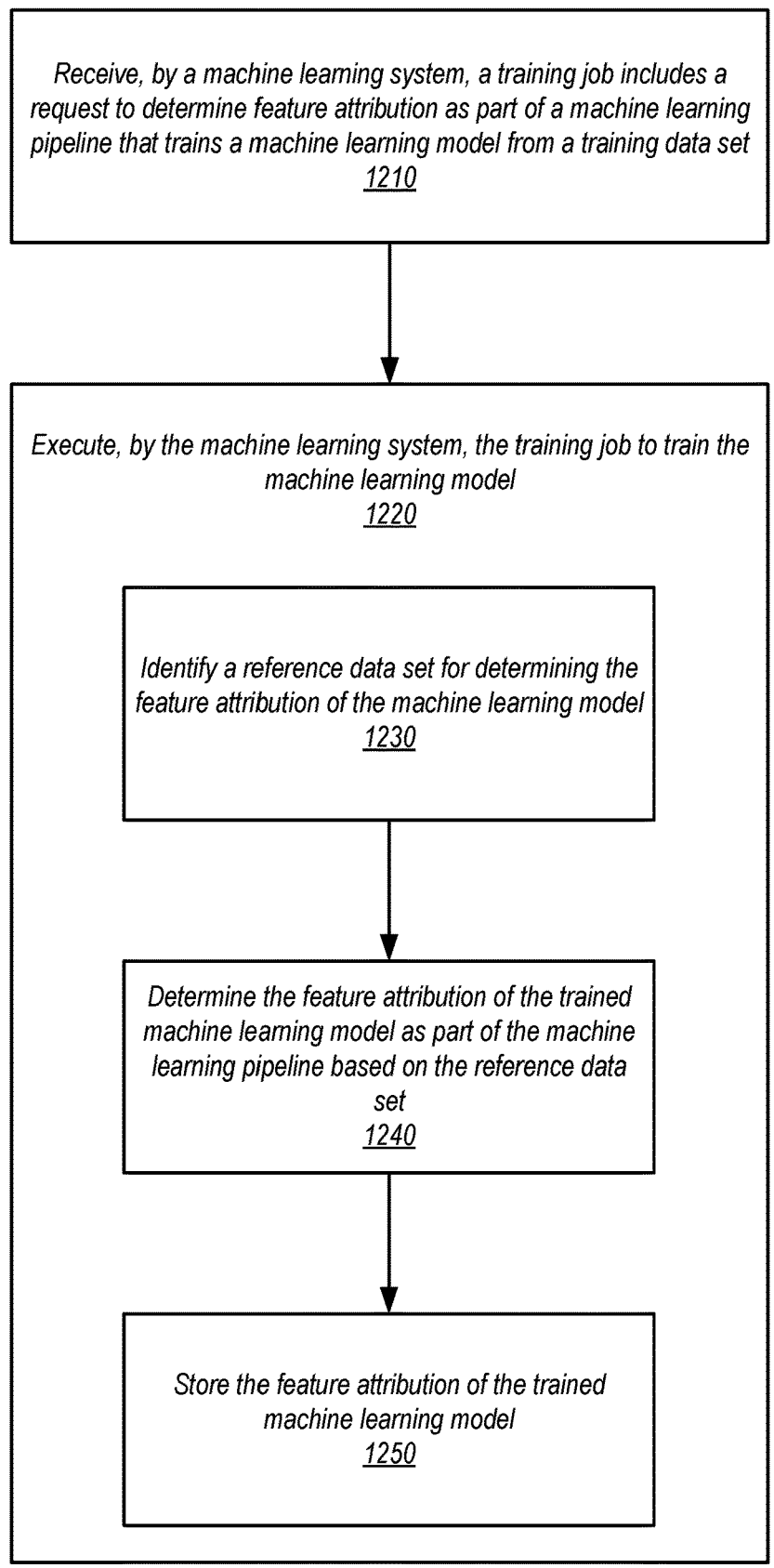
FIG. 12 is a high-level flowchart illustrating various methods and techniques for capturing feature attribution in machine learning pipelines, according to some embodiments.

FIG. 12 is a high-level flowchart illustrating various methods and techniques for capturing feature attribution in machine learning pipelines, according to some embodiments. As indicated at 1210, a training job that includes a request to determine feature attribution as part of a machine learning pipeline that trains a machine learning model from a training data set may be received by a machine learning system, in some embodiments. For example, as discussed above with regard to FIG. 3, an interface for specifying explanation configuration measurements for a fairness and explainability processing container 320 may be invoked in a training job to specify features, such as a specified feature attribution technique (e.g., the SHAP technique or other supported feature attribution measurement technique), a reference data set of one or more rows in a data set or a data object (e.g., file, pathway, or location of the object), a parameter to indicate how to generate a default reference data set if one is not provided, aggregation parameter for global explanation values, such as mean, mean squared, or median, a parameter to log model predictions used for computing feature attribution, among other features.

Similar to FIG. 11 above, as indicated at 1220, the machine learning system may execute the training job to train the machine learning model, in various embodiments. For example, the various stages discussed above with regard to training a machine learning model may be performed, including preparing training data and applying machine learning training techniques. Integrated as part of the performance of the training job may be feature attribution measurement that occurs after the machine learning model is trained, in some embodiments. As indicated at 1230, a reference data set for determining feature attribution of the machine learning model may be determined, in some embodiments. For example, the training job may explicitly identify the values to be included in the reference data set. In some embodiments, no reference data set may be specified, so the machine learning training system may generate a reference data set automatically. In some embodiments, a default reference data set may be used if none is specified.

As indicated at 1240, the feature attribution of the trained machine learning model may be determined as part of the machine learning pipeline based on the reference data set, in some embodiments. For example, SHAP values may be generated to provide a global feature attribution for the trained machine learning model, which may be calculated using distributed techniques discussed below with regard to FIG. 14. In some embodiments, the feature attribution may be calculated using a specified aggregation techniques (e.g., mean, mean squared, or median value). As indicated at 1250, the feature attribution of the trained machine learning model may be stored, in some embodiments. For example, as discussed above, the training job may be associated with an experiment trial, and thus the bias metrics may be stored as part of a report associated with the trial metric, in some embodiments. A backend store or storage location may be identified (or specified in the training job) for the feature attribution, in some embodiments.

Figure 13:
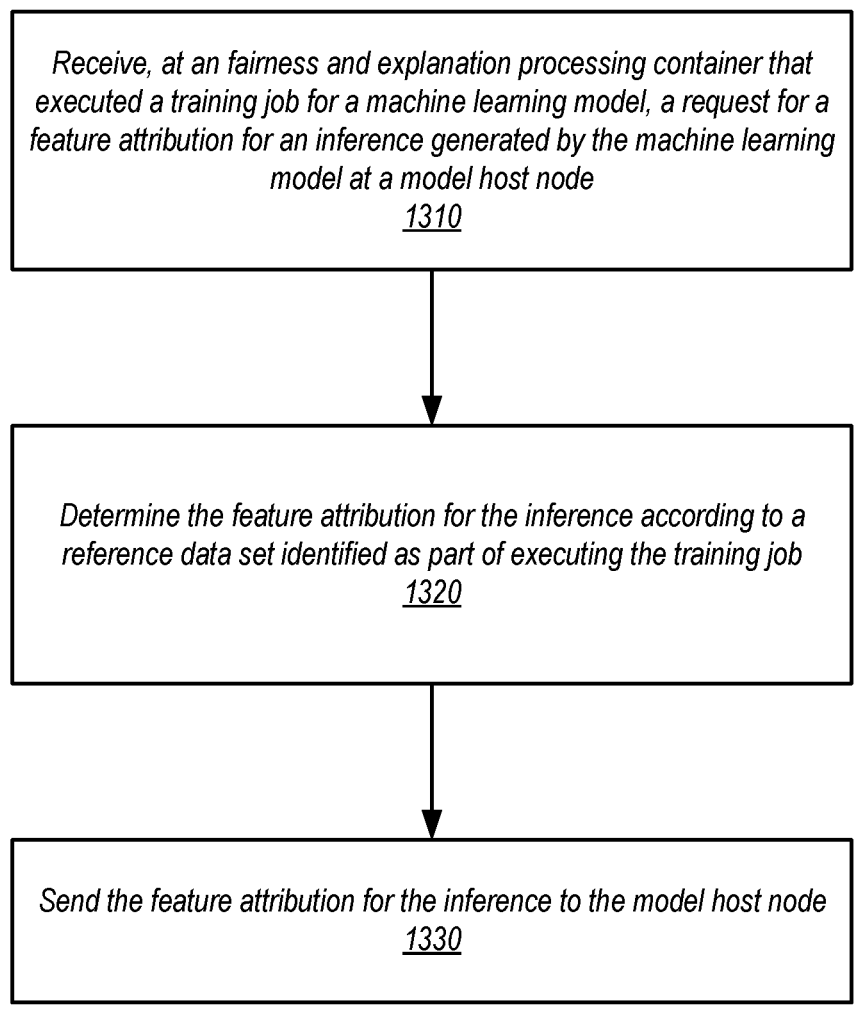
FIG. 13 is a high-level flowchart illustrating various methods and techniques for generating feature attribution for specific inferences determined by a trained machine learning model, according to some embodiments.

In some embodiments, local feature attribution values may be generated in order to provide an explanation for a specific inference performed by the trained machine learning model. FIG. 13 is a high-level flowchart illustrating various methods and techniques for generating feature attribution for specific inferences determined by a trained machine learning model, according to some embodiments. As indicated at 1310, a request for a feature attribution for an inference generated by a machine learning model at a model host node may be received at a fairness and explanation processing container that executed a training job for a machine learning model, in some embodiments. For example, as discussed above with regard to FIG. 5, the request may provide the inference (or input data used to make the inference).

As indicated at 1320, the feature attribution for the inference may be determined according to a reference data set identified as part of executing the training job, in some embodiments. For example, if the reference data set was one or more rows in a tabular data set used for training the machine learning model, the one or more rows may be obtained and used to generate an inference using a shadow endpoint in order to then make a determination of the feature attribution for the specific inference (e.g., generating SHAP values as discussed above). As indicated at 1330, the feature attribution for the inference may then bet sent to the model host node, in some embodiments.

Figure 14:
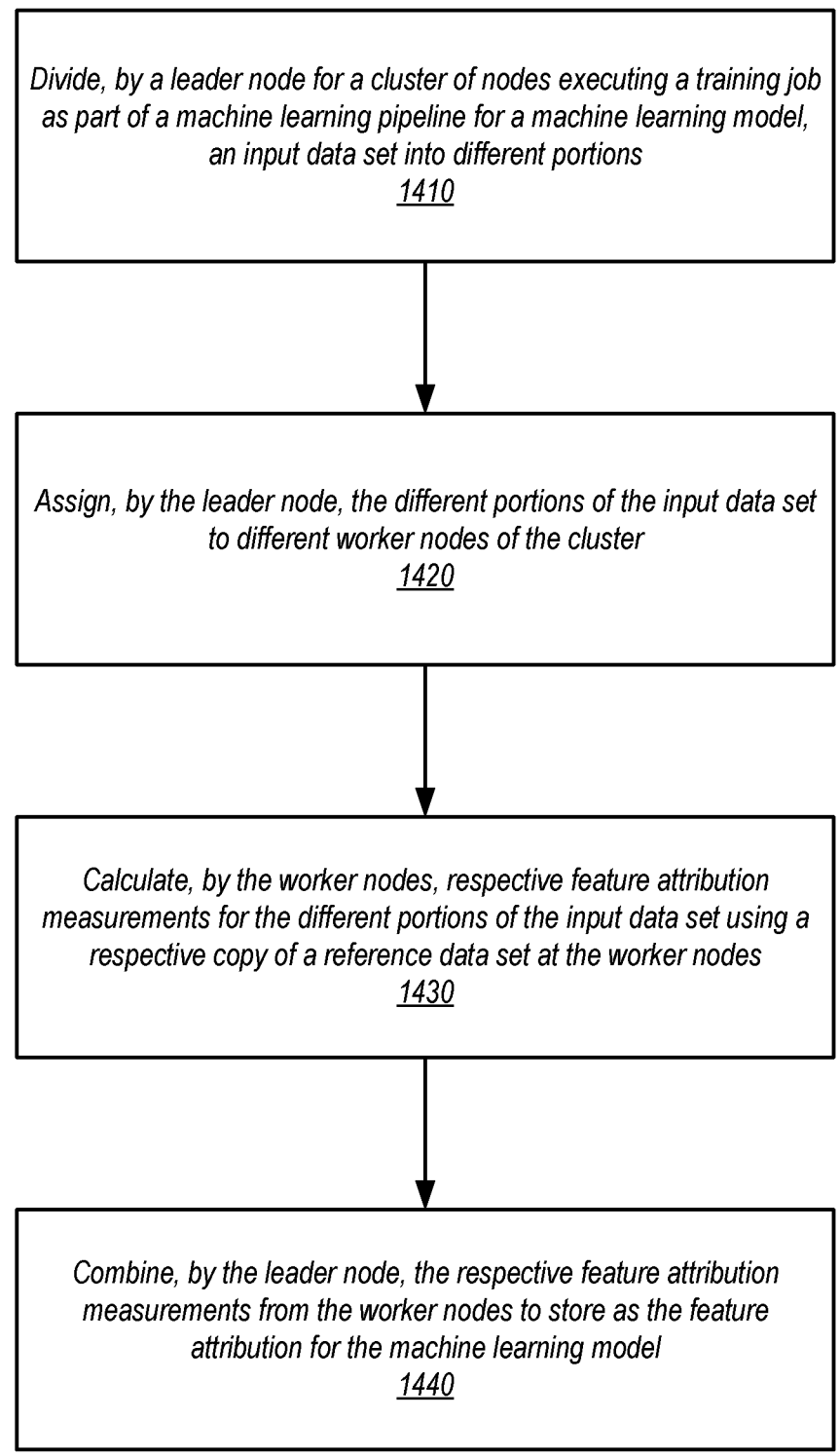
FIG. 14 is a high-level flowchart illustrating various methods and techniques for distributed computation of feature attribution for a trained machine learning model, according to some embodiments.

As discussed above with regard to FIG. 5, some feature attribution computations can become expensive and time-consuming if performed on a single computing resource (e.g., node). Distributed techniques, however, may be used to increase the speed and efficiency in which a feature attribution may be generated. FIG. 14 is a high-level flowchart illustrating various methods and techniques for distributed computation of feature attribution for a trained machine learning model, according to some embodiments. As indicated at 1410, a leader node of a cluster of nodes executing a training job as part of a machine learning pipeline for a machine learning model may divide an input data set into different portions. For example, different techniques for assigning processing responsibility, including other workloads present on the different nodes in addition to the feature attribution computation may be used to efficiently balance the sizes of the portions of the input data set to achieve a fastest computation of the feature attribution. Therefore, in at least some embodiments, the divided portions of the input data set may not be equally sized. As indicated at 1420, the leader node may assign the different portions of the input data set to different worker nodes of the cluster, in some embodiments.

As indicated at 1430, respective feature attribution measurements may be calculated by the worker nodes using a respective copy of a reference data set at the worker nodes, in some embodiments. In some embodiments, the assigned portions of the input data set may be read in parallel from a separate data store (e.g., read requests to one or more data objects storing the respective portions of the input data in storage service 230). The respective feature attribution measurements may then be returned to the leader node. As indicated at 1440, the leader node may combine the respective feature attribution measurements from the worker nodes to store as the feature attribution for the machine learning model, in some embodiments. The combined measurement may, for instance, be performed according to the specified aggregation parameter (e.g., mean, mean squared, median). The combined measurement may be stored, as discussed above with regard to FIG. 12.

Figure 15:
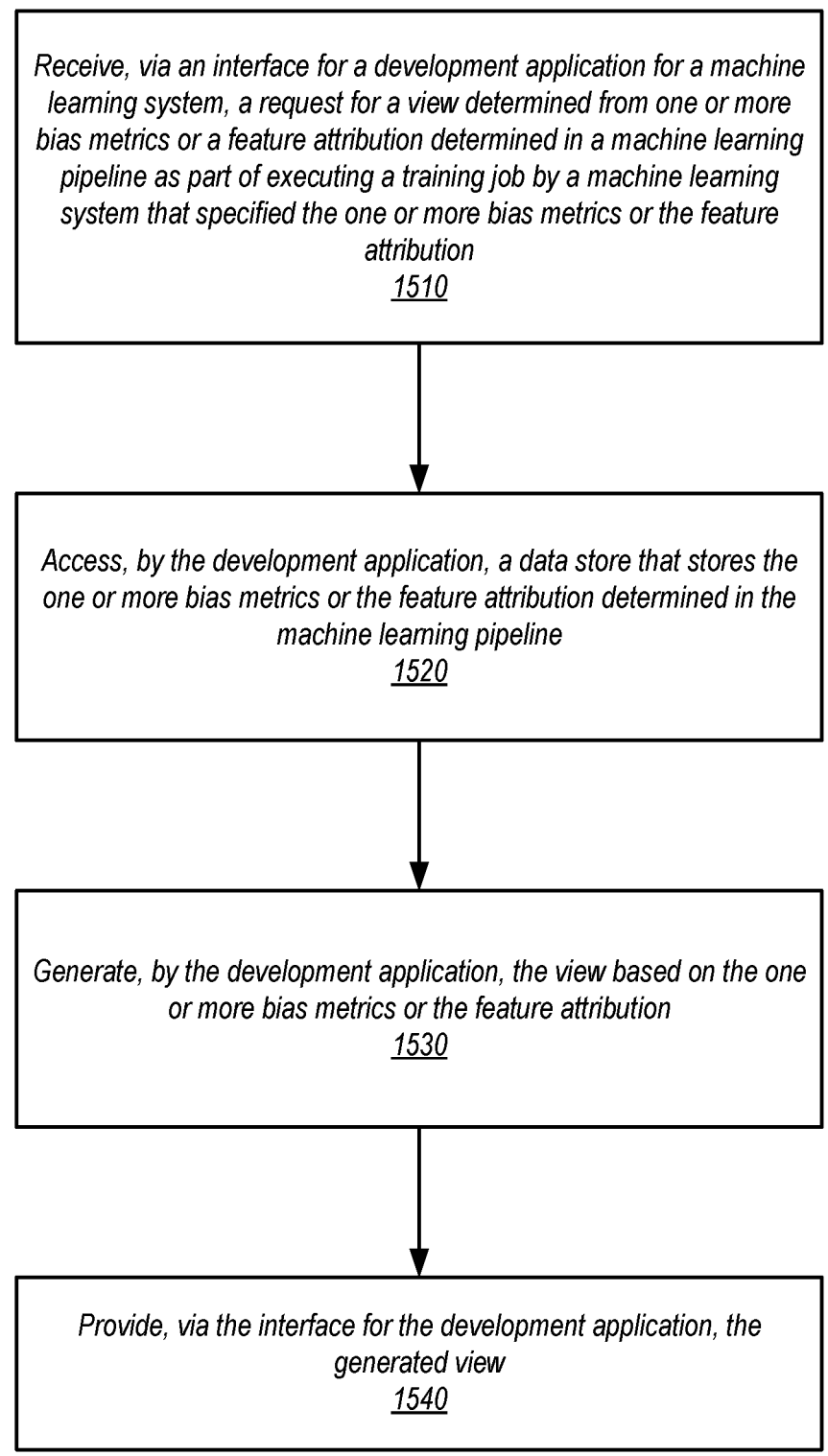
FIG. 15 is a high-level flowchart illustrating various methods and techniques for generating views for captured bias measurements and explainability, according to some embodiments.

As discussed above with regard to FIGS. 6-8, integration of bias metrics and feature attribution in a machine learning pipeline may provide for the capability to quickly generate views at various stages in development of a machine learning model. FIG. 15 is a high-level flowchart illustrating various methods and techniques for generating views for captured bias measurements and explainability, according to some embodiments. As indicated at 1510, a request for a view determined from one or more bias metrics or a feature attribution may be received via an interface for a development application. The one or more bias metrics or the feature attribution may be determined as part of executing a training job by a machine learning system, where the training job specified the one or more bias metrics or the feature attribution, in some embodiments. For example, an interface, such as development and management environment 213 may implement various interface elements or support commands to generate a view of the bias metric(s) or the feature attribution. As discussed above, the request may specify a specific experiment trial, in some embodiments. As illustrated in FIGS. 7 and 8, various features to configure the format of the view may be specified, such as sorting, filter, or otherwise manipulating view results.

As indicated at 1520, the development application may access a data store that stores the one or more bias metrics or the feature attribution determined in the machine learning pipeline, in some embodiments. For example, a configuration file or other mapping may be used to determine a location of metrics or measurements determined for the training job (e.g., in a training job configuration file). As indicated at 1530, the requested view may be generated by the development application based on the accessed one or more bias metrics or the feature attribution, in some embodiments. For example, the various views discussed above with regard to FIGS. 7 and 8, as well as other views, may be generated according to the request, in some embodiments.

As indicated at 1540, the generated view may be provided via the interface for the development application, in some embodiments. For example, a visual view may be displayed or a text-based view or report may be downloaded. In some embodiments, the view may be stored for later access in storage location specified in the request for the view.

Figure 16:
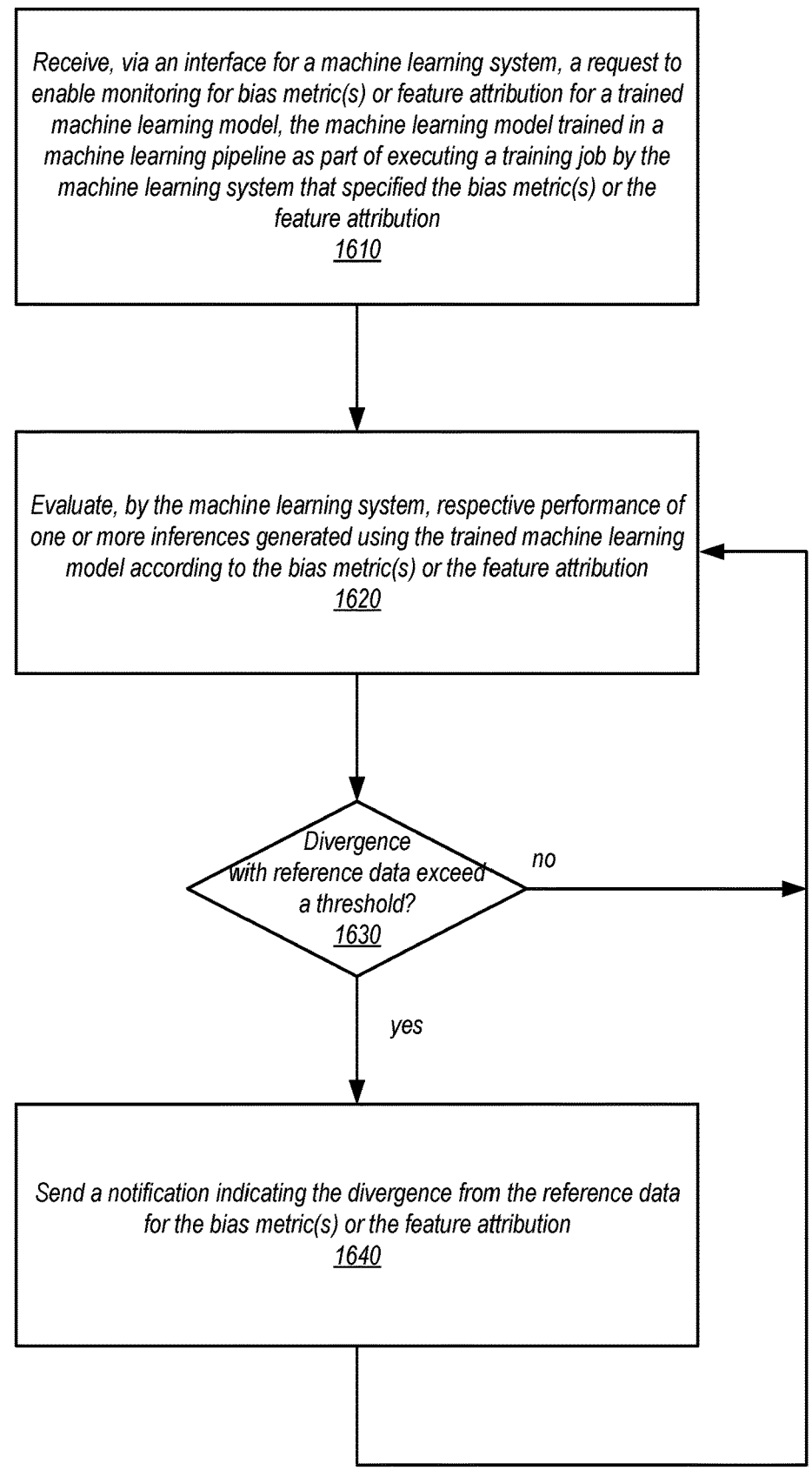
FIG. 16 is a high-level flowchart illustrating various methods and techniques for monitoring bias measurements and feature attribution for trained machine learning models, according to some embodiments.

As discussed above with regard to FIG. 1, monitoring for bias and feature attribution after a trained machine learning model is deployed may provide opportunities to capture bias and changes in explanation that were not visible when training the machine learning model. FIG. 16 is a high-level flowchart illustrating various methods and techniques for monitoring bias measurements and feature attribution for trained machine learning models, according to some embodiments. As indicated at 1610, a request to enable monitoring for bias metric(s) or feature attribution for a trained machine learning model may be received via an interface for a machine learning system, in various embodiments. The machine learning model may be trained as part of executing a training job by the machine learning system that specified the bias metrics or the feature attribution, in some embodiments. For example, as discussed above with regard to FIGS. 1 and 9, an interface for a monitoring job may allow for various monitoring job features to be specified, such as attribute, bias metrics for the attribute to be monitored, threshold for alarm, reference data set for comparison for bias metric monitoring jobs and reference feature attributions, from training reports or past measurements for feature attribution monitoring jobs.

In various embodiments, a monitoring job may be enabled to perform evaluations (e.g., at scheduled or specified time intervals), in order to evaluate, by the machine learning system, respective performance of one or more inferences generated using the trained machine learning model according to the bias metric(s) or the feature attribution, in some embodiments, as indicated at 1620. For example, as discussed above with regard to FIG. 1, NDCG may be performed to detect drift in feature attribution by comparing how the ranking of the individual features changed from the feature attribution calculated for the reference data set (e.g., training data) to feature attribution calculated for the one or more inferences. For bias metrics, a comparison between a specified threshold bias which may be the reference data and the current bias metric(s) may be performed.

If, as indicated by the negative exit from 1630 no divergence is detected (or no divergence that exceed a threshold amount of divergence), then monitoring may continue by returning to evaluation, at 1620. If, as indicated by the positive exit from 1630, a divergence with reference data is detected that exceeds an allowed amount of divergence as indicated by a threshold, then a notification may be sent indicating the divergence from the reference data for the bias metrics or the feature attribution, in some embodiments, as indicated at 1640. For example, a monitoring service may be sent an alert, a warning may be displayed via an interface such as development and management environment 213, or other communication technique.

The methods described herein may in various embodiments be implemented by any combination of hardware and software. For example, in one embodiment, the methods may be implemented on or across one or more computer systems (e.g., a computer system as in FIG. 17) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 17:
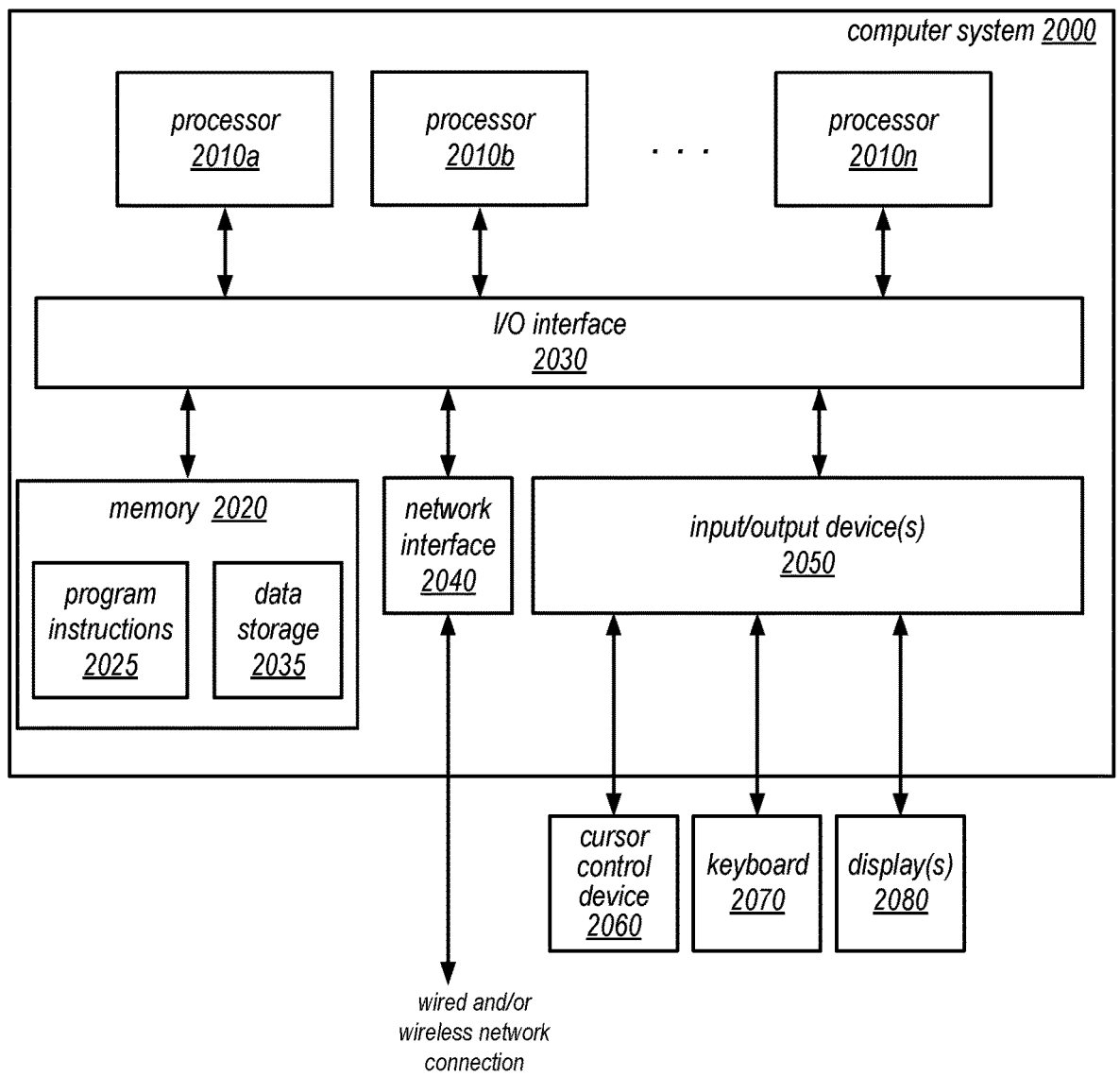
FIG. 17 illustrates an example system to implement the various methods, techniques, and systems described herein, according to some embodiments.

Embodiments of staged bias measurements and feature attribution captured in machine learning pipelines as described herein may be executed on one or more computer systems, which may interact with various other devices. One such computer system is illustrated by FIG. 17. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement staged bias measurements, captured feature attribution, view generation for bias measurements and explainability, and monitoring fairness and feature attribution, are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 17, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of computing devices, respectively comprising at least one processor and a memory, that are configured to implement a machine learning service, wherein the machine learning service is configured to:
receive, via development environment interface of the machine learning service, code that instructs execution of a plurality of stages of a machine learning pipeline that executes a training job, wherein the code instructs, for an attribute in a training data set, determination of one or more bias metrics at a pre-training stage and a post-training stage in the machine learning pipeline that trains a machine learning model from the training data set;
dispatch, by a control plane of the machine learning service, the training job to a training node of the machine learning service;
execute, by the training node, the training job to train the machine learning model according to the code, wherein to execute the training job, the program instructions cause the at least one processor to:
execute a first portion of the code that specifies the one or more bias metrics and invokes a first corresponding library at the training node that is used to determine the one or more bias metrics at the pre-training stage in the machine learning pipeline for the attribute;
execute a second portion of the code to train the machine learning model; and
execute a third portion of the code that specifies the one or more bias metrics and invokes a second corresponding library at the training node that is used to generate the one or more bias metrics at the post-training stage in the machine learning pipeline for the attribute; and
store a report comprising the one or more bias metrics for the pre-training stage and the post-training stage in addition to storing the trained model.

2. The system of claim 1, wherein the code further instructs one or more label values or a threshold for positive outcome for the attribute.

3. The system of claim 1, wherein the respective one or more bias metrics for the pre-training stage and the post-training stage are selections out of a plurality of bias metrics supported for the pre-training stage and the post-training stage.

4. The system of claim 1, wherein the training job is executed using a fairness and explainability processing container implemented as part of operating system virtualization offered by the machine learning service at the training node.

5. A method, comprising:
receiving, via development environment interface of the machine learning service, code that instructs execution of a plurality of stages of a machine learning pipeline that executes a training job, wherein the code instructs, for an attribute in a training data set, determination of one or more bias metrics at a plurality of different stages in the machine learning pipeline that trains a machine learning model from the training data set;
dispatching, by a control plane of the machine learning service, the training job to a training node of the machine learning service;
executing, by the training node according to the code, the training job to train the machine learning model, wherein the executing comprises:
execute different portions of the code to:
determine the one or more bias metrics specified in respective ones of the different portions of the code at the plurality of different stages in the machine learning pipeline for the specified attribute according to one or more corresponding libraries at the training node invoked by one or more portions of the different portions of the code; and
train the machine learning model; and
storing the one or more bias metrics for the plurality of different stages in addition to storing the trained machine learning model.

6. The method of claim 5, wherein the respective one or more bias metrics for one of the plurality of stages are selected out of a plurality of bias metrics supported for a pre-training stage.

7. The method of claim 5, wherein the code further instructs one or more label values or a threshold for positive outcome for the attribute.

8. The method of claim 5, wherein one of the one or more bias metrics is a conditional demographic disparity and wherein the training further specifies a label and a group attribute for the conditional demographic disparity.

9. The method of claim 5, wherein the stored one or more bias metrics for the plurality of different stages are associated with a trial report for the machine learning pipeline.

10. The method of claim 5, wherein the code further instructs determining feature attribution for the machine learning model as part of the machine learning pipeline and wherein the executing further comprises:
executing another portion of the code to determine the feature attribution for the machine learning model; and
storing the feature attribution for the machine learning model.

11. The method of claim 5, wherein one of the plurality of different stages is a training stage that respectively determines the metrics between a plurality of training runs performed using the training data set.

12. The method of claim 5, wherein the code invokes one or more Application Programming Interfaces (APIs) of a fairness and explainability processing container implemented as part of operating system virtualization offered by the machine learning service.

13. The method of claim 5, wherein the one or more bias metrics for the plurality of different stages are stored as part of a report in a data storage service.

14. One or more non-transitory, computer-readable storage media, storing program instructions that when executed on or across one or more computing devices cause the one or more computing devices to implement a machine learning service that implements:
  receiving, via a development interface of the machine learning service, code that instructs execution of a plurality of stages of a machine learning pipeline that executes a training job, wherein the code instructs, for an attribute in a training data set, determination of one or more bias metrics at a plurality of different stages in the machine learning pipeline that trains a machine learning model from the training data set;
  dispatching, by a control plane of the machine learning service, the training job to a training node of the machine learning service;
  executing, by the training node, the training job to train the machine learning model according to the code, wherein the executing comprises:
    executing different portions of the code to:
      determine the one or more bias metrics specified in respective ones of the different portions of the code at the plurality of different stages in the machine learning pipeline for the specified attribute according to one or more corresponding libraries at the training node invoked by one or more portions of the different portions of the code; and
    train the machine learning model; and
    storing the one or more bias metrics for the plurality of different stages in addition to storing the trained machine learning model.

15. The one or more non-transitory, computer-readable storage media of claim 14, wherein the respective one or more bias metrics for one of the plurality of stages are selected out of a plurality of bias metrics supported for a post-training stage.

16. The one or more non-transitory, computer-readable storage media of claim 14, wherein the code further instructs one or more label values or a threshold for positive outcome for the attribute.

17. The one or more non-transitory, computer-readable storage media of claim 14, wherein the stored one or more bias metrics for the plurality of different stages are associated with a trial report for the machine learning pipeline.

18. The one or more non-transitory, computer-readable storage media of claim 14, wherein one of the plurality of different stages is a training stage that respectively determines the metrics between a plurality of training runs performed using the training data set.

19. The one or more non-transitory, computer-readable storage media of claim 14, wherein the code further instructs determining feature attribution for the machine learning model as part of the machine learning pipeline and wherein, in the executing, the program instructions cause the one or more computing devices to further implement:
  executing another portion of the code to determine the feature attribution for the machine learning model; and
  storing the feature attribution for the machine learning model.

20. The one or more non-transitory, computer-readable storage media of claim 14, wherein the code invokes one or more Application Programming Interfaces (APIs) of a fairness and explainability processing container implemented as part of operating system virtualization offered by a machine learning service.

* * * * *